United States Patent [19]

Inaba et al.

[11] Patent Number: 5,496,607
[45] Date of Patent: Mar. 5, 1996

[54] MAGNETIC RECORDING MEDIUM

[75] Inventors: Hiroo Inaba; Kiyomi Ejiri; Jun-ichi Nakamikawa; Toshihiko Miura, all of Kanagawa, Japan

[73] Assignee: Fuji Photo Film Co., Ltd., Kanagawa, Japan

[21] Appl. No.: 348,949

[22] Filed: Nov. 25, 1994

Related U.S. Application Data

[63] Continuation of Ser. No. 45,171, Apr. 13, 1993, abandoned.

[30] Foreign Application Priority Data

Apr. 14, 1992 [JP] Japan .................................. 4-119608

[51] Int. Cl.$^6$ .............................. B32B 3/02; B32B 5/16; G11B 5/66

[52] U.S. Cl. ............... 428/65.3; 428/336; 428/694 B; 428/694 BS; 428/694 BN; 428/694 BA; 428/694 BH; 428/694 BM; 428/900

[58] Field of Search ............... 428/694 B, 694 BS, 428/694 BN, 694 BA, 694 BH, 900, 694 BM, 65.3

[56] References Cited

U.S. PATENT DOCUMENTS

| | | | |
|---|---|---|---|
| 4,367,263 | 1/1983 | Kawahara | 428/336 |
| 4,649,073 | 3/1987 | Suzuki | 428/212 |
| 4,741,953 | 5/1988 | Katsuta | 428/323 |
| 4,794,042 | 12/1988 | Kubota | 428/328 |
| 4,847,147 | 7/1989 | Aonuma | 428/329 |
| 4,857,388 | 8/1989 | Ogawa | 428/212 |
| 4,863,793 | 9/1989 | Ogawa | 428/323 |
| 4,865,924 | 9/1989 | Saito et al. | 428/694 |
| 4,963,433 | 10/1990 | Ogawa et al. | 428/323 |

*Primary Examiner*—Leszek Kiliman
*Attorney, Agent, or Firm*—Sughrue, Mion, Zinn, Macpeak & Seas

[57] ABSTRACT

Disclosed is a magnetic recording medium comprising at least two layers comprising at least one lower non-magnetic layer containing at least a non-magnetic particle and a binder on a non-magnetic support, and at least one upper magnetic layer containing at least a ferromagnetic particle and a binder on the lower non-magnetic layer, wherein a mean total thickness d of the upper magnetic layer is more than 0.01 μm to less than 0.3 μm, and a standard deviation σ of the total thickness of the upper magnetic layer and the mean total thickness d of the upper magnetic layer satisfy the relationship of $0.05 \leq \sigma/d \leq 0.5$.

20 Claims, 4 Drawing Sheets

△ COMPARATIVE EXAMPLE 1-5 (VAPOR DEPOSITION TYPE TAPE) d=0.2(μm)
□ COMPARATIVE EXAMPLE 1-6, d=0.3(μm)
○ EXAMPLE 1-1, d=0.28(μm)
⊖ EXAMPLE 1-2, d=0.15(μm)
● EXAMPLE 1-3, d=0.02(μm)
▲ COMPARATIVE EXAMPLE 1-4, d=0.01(μm)

□ COMPARATIVE EXAMPLE 1-4, d=0.01 (μm)
○ EXAMPLE 1-1, d=0.28 (μm)
⊖ EXAMPLE 1-2, d=0.15 (μm)
△ COMPARATIVE EXAMPLE 1-5 (VAPOR DEPOSITION TYPE TAPE TAPE), d=0.2 (μm)

MAGNETIC RECORDING MEDIUM

This is a Continuation of application Ser. No. 08/045,171 filed Apr. 13, 1993, now abandoned.

FIELD OF THE INVENTION

The present invention relates to a magnetic recording medium, especially to an extremely thin magnetic layer having a thickness of less than 3 µm. More precisely, it relates to a coating type magnetic recording medium well-suited for high density recording.

BACKGROUND OF THE INVENTION

Magnetic recording media are widely used as a sound recording tape, video tape, computer tape, recording disc and the like. Ever-increasing demands have had to be met for increased magnetic recording density and shortened (higher frequency) recording wavelength. The recording system for these devices varies from an analogue system to a digital system. In response to the current demand for elevation of the magnetic recording density of the recording medium, a magnetic recording medium having a thin metal film, e.g., vapor deposition type, as the magnetic layer has been proposed. However, in view of the more facile productivity and practical reliability against corrosion or the like, a so-called coating type magnetic recording medium is nonetheless preferred. In a coating type magnetic recording medium, a dispersion of a ferromagnetic powder in a binder has been coated on the support. However, since a coated medium has a relatively low filling degree with respect to the magnetic substance, as compared with a medium having a thin metal film, the former is inferior to the latter with respect to the electromagnetic characteristic.

In any event, a widely used coating type magnetic recording medium comprises a dispersion of a ferromagnetic iron oxide, Co-modified ferromagnetic iron oxide powder, $CrO_2$ powder or ferromagnetic alloy powder that has been coated on a non-magnetic support to form a magnetic layer thereon.

In order to improve the electromagnetic characteristic of such a coating type magnetic recording medium proposals have included, for example, improvement of the magnetic characteristic of the ferromagnetic powder added to the magnetic layer of the medium and smoothing of the surface of the medium. However, these proposed methods are not adequate to sufficiently elevate the magnetic recording density of the medium.

Recently, the recording wavelength for a coating type magnetic recording medium is being shortened concomitantly with elevation of the magnetic recording density of the medium. As a result, if the thickness of the coated magnetic layer is large, problems of self-demagnetization loss in recording with a lowered output arise and thickness loss in reproduction are serious.

Therefore, in response, reduction in the thickness of the magnetic layer has been attempted. If, however, the thickness of the magnetic layer is reduced to about 2 µm or less, the surface of the magnetic layer would often be influenced by the non-magnetic support so that the electromagnetic characteristic and drop-out of the medium would worsen. However, the influence of the rough surface of the support would be avoided if a thick non-magnetic undercoating layer is provided on the surface of the support and then a magnetic layer is coated over the undercoating layer as an upper layer, as proposed in JP-A-57-198536 (the term "JP-A" as used herein means an "unexamined published Japanese patent application"). However, that method still has a problem in that the head abrasion resistance and the head durability worsen. The problem is considered attributable to the fact that a thermosetting resin is used as a binder in the lower non-magnetic layer. As a consequence, the lower non-magnetic layer is hardened so that the friction between the upper magnetic layer and head, as well as the contact of the upper magnetic layer with other parts, are effected under no buffer condition. The magnetic recording layer having such a lower non-magnetic layer has poor flexibility.

In order to avoid the problem, the use of a non-hardening resin as a binder in the lower non-magnetic layer is conceivable.

In accordance with the conventional method where the lower non-magnetic layer is coated and dried and then the magnetic layer is coated thereover as an upper layer, however, the lower non-magnetic layer would be swollen by the organic solvent in the coating solution for the upper magnetic layer to cause turbulence of the coating solution for the upper magnetic layer. As a result, the surface property of the upper magnetic layer would thereby be worsened and the electromagnetic characteristic of the medium would thereby be lowered. However, in order to reduce the thickness of the magnetic layer, reduction of the amount of the magnetic coating solution for the upper magnetic layer, or reduction of the concentration of the magnetic coating solution by adding a large amount of a solvent thereto, may be envisioned. In the former case of reducing the amount of the coating solution for the upper magnetic layer, however, drying of the coated layer would start before allowing sufficient leveling time to pass after the coating to cause another problem of coating defects of giving streaks or stamped patterns on the surface of the upper magnetic layer coated. As a result, the yield of the method would be extremely low.

On the other hand, in the latter case of using a magnetic coating solution having a low concentration, the coated film would be highly porous so that sufficient filling degree of a magnetic substance in the film could not be attained, and additionally, the strength of the coated film would be insufficient as the film is too porous. In short, both methods mentioned above have various unfavorable problems. Similarly, in the invention of JP-A-62-154225, it is insufficient in performance in respect to durability. This tendency becomes significant particularly when the thickness of the upper magnetic layers are less than 0.3 µm.

As one means of overcoming the above problems, a method of simultaneous multi-coating system where a lower non-magnetic layer is provided and, while the lower non-magnetic layer is still wet, an upper magnetic layer containing a ferromagnetic powder is provided over the lower layer has been already proposed as described in U.S. Pat. No. 4,963,433 (corresponding to JP-A-63-191315) and U.S. Pat. No. 4,863,793 (corresponding to JP-A-63-187418). This technique yields a magnetic recording medium with high producibility, wherein the medium is free from coating defects and has elevated productivity, improved electromagnetic characteristics such as output and C/N ratio and improved running durability.

However, even using this method, when the thickness of the upper magnetic layer is less than 0.3 µm, the strength of the magnetic layer is significantly decreased, leading to increases in simultaneous clogging and drop out. In order to solve such a problem of durability, it is proposed to add a large-sized filler to the lower non-magnetic layer, as described in JP-A-62-222427 and JP-A-2-257424. These proposals have however the drawback that the surface smoothness is insufficient.

In digital magnetic recording media which have come in practice recently, mutual interference takes place between adjacent reversals of magnetization in continuous high density reversals of magnetization, and a decrease in output peak value and a shift of a peak position occur to an isolated pulse waveform, which contributes to a detection error. The recording density is therefore prevented from being improved. In order to solve this problem and improve the recording density, it is necessary to reduce a half-value width of the isolated pulse waveform to decrease the interference of a symbol width. However, no coating type magnetic recording medium fully satisfying this demand has been obtained.

For this purpose, it is known that a decrease in the thickness of a magnetic layer, a decrease in Br/Hc (residual magnetic flux density/coercive force) and a reduction in surface roughness are effective. However, no example is known in which these are experimentally examined, for example, for a signal with a recording wavelength of 1 μm or less in a coating type magnetic recording medium.

Furthermore, a decrease in the thickness of an upper magnetic layer deteriorates its adhesive property with a lower non-magnetic layer, so that the upper magnetic layer is liable to be separated from the lower non-magnetic layer. It becomes therefore difficult to ensure the running durability.

Accordingly, a coating type magnetic recording medium satisfying this demand has been desired, but no effective solution has been proposed yet.

For suitability with respect to digital recording, reference can be made to Katsuya Yokoyama, *Guide to Magnetic Recording Technology* (published by Sogo Denshi Shuppan, 1988).

SUMMARY OF THE INVENTION

An object of the present invention is to provide a magnetic recording medium having satisfactory electromagnetic characteristics such a high output, resolution, waveform symmetry and overwrite characteristic equal to or more than those of a vapor deposition type magnetic recording medium while maintaining adequate running properties, durability and productivity of a coating type magnetic recording medium.

Another object of the present invention is particularly to provide a magnetic recording medium which brings about strain-free regenerative signals suitable for digital recording, and in which separation of an upper magnetic layer does not take place.

According to the present invention, there is provided a magnetic recording medium comprising at least two layers comprising at least one lower non-magnetic layer containing at least a non-magnetic particle and a binder on a non-magnetic support, and at least one upper magnetic layer containing at least a ferromagnetic particle and a binder on the lower non-magnetic layer, wherein a mean total thickness d of the upper magnetic layer is more than 0.01 μm to less than 0.3 μm, and a standard deviation σ of the total thickness of the upper magnetic layer and the mean total thickness d of the upper magnetic layer satisfy the following relationship:

$$0.05 \leq \sigma/d \leq 0.5$$

DETAILED DESCRIPTION OF THE INVENTION

Figure 1:
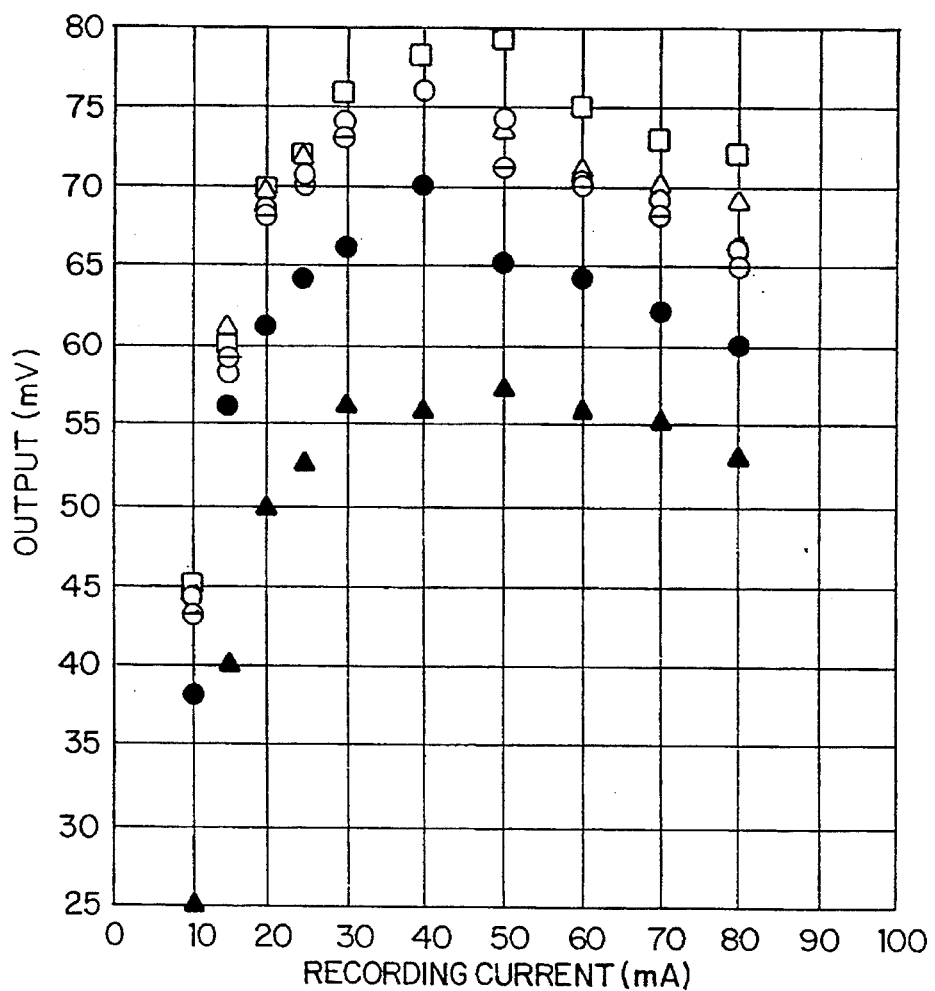
FIG. 1 is a graph showing changes in output with recording current for video tapes of the present invention and for comparative tapes.

The present invention is characterized in that the mean total thickness d of the upper magnetic layer is generally more than 0.01 to less than 0.3 μm, preferably from 0.02 to 0.25 μm, more preferably from 0.03 to 0.23 μm, and that σ/d is generally from 0.05 to 0.5, preferably from 0.1 to 0.4.

Namely, even when the recording wavelength is decreased to 1.0 μm or less, an output $E_p$ on digital recording is sufficient and a half-value width $W_{50}$ of a small isolated pulse waveform on reproduction can be obtained by specifying the mean total thickness d to less than 0.3 μm. Furthermore, satisfactory electromagnetic characteristics preventing a reversal phenomenon is obtained also in a vapor deposition type tape position, high density recording is made possible in a magnetic recording disk, and overwrite characteristic can be improved. If the mean total thickness d is not more than 0.01 μm, a sufficient output cannot be obtained.

The half-value width $W_{50}$ of the isolated pulse waveform is also called a pulse half-value width, which is a basic characteristic of digital magnetic recording. A regenerative signal of reversal of one magnetization, namely a regenerative signal of isolated magnetization pulse, forms a mountain-shaped pulse waveform with the widened foot. A peak value of this regenerative pulse is an output peak value $E_p$, and a pulse width (a value converted to a length on a medium) at which the output reaches 50% of the peak value is called the pulse half-value width represented by $W_{50}$. The smaller this $W_{50}$ value is, the sharper the waveform becomes. The resolution is therefore improved, which is effective for high density recording. When the reversals take place continuously and the intervals of the reversals are shortened, mutual interference takes place between the adjacent reversals of magnetization to affect a regenerative waveform. Namely, intersymbol interference becomes liable to occur. However, if $W_{50}$ is small, such trouble is attenuated and reduced. Details on these properties are described in Katsuya Yokoyama, *Guide to Magnetic Recording Technology* (published by Sogo Denshi Shuppan, 1988).

Further, symmetry γ of the isolated pulse waveform is calculated in the following manner. Namely, when a perpendicular line drawn from the peak position of the isolated pulse waveform partitions $W_{50}$ at $W_1$ and $W_2$, $W_1+W_2=W_{50}$ holds. At this time, the waveform symmetry γ is calculated by using $\gamma=100\times(W_1-W_2)/W_{50}$.

In the case of a vapor deposition metal thin film type magnetic recording medium, in order to record and reproduce by means of a ring head, it is required to obliquely arrange magnetic fine crystal particles in a vapor deposition type film. By this arrangement, a magnetic domain structure is obliquely positioned to the ring head, which results in the drawback that the isolated pulse waveform becomes unsymmetrical.

On the other hand, in the coating type magnetic recording medium of the present invention, $W_{50}$ is small and $E_p$ is high as compared with such a vapor deposition metal thin film type magnetic recording medium. In addition, a ferromagnetic particle can be easily orientated in a plane. Accordingly, the symmetry of the isolated pulse waveform is improved. The magnetic recording medium of the present invention also has the effect that signal processing in a digital recording system becomes facile and accurate by a reduction in reading error of signals.

Further, when the total thickness of the upper magnetic layer is less than 0.3 μm, the upper magnetic layer is extremely decreased in strength and tends to be separated from the lower non-magnetic layer during running. As a result, clogging and an increase in drop out are liable to take place. In order to discourage this, it is necessary that the interface of the upper magnetic layer and the lower non-magnetic layer has unevenness to some extent so as to give an anchor effect between the upper magnetic layer and the lower non-magnetic layer. The confirmation by experiments revealed that the above-mentioned σ/d range was adequate, thus completing the present invention.

By specifying the σ/d within the range of the present invention, the upper magnetic layer is not separated from the lower non-magnetic layer and the running properties are improved. If the σ/d is less than 0.05, the anchor effect between the upper magnetic layer and the lower non-magnetic layer is too small to obtain good performance. If the σ/d is more than 0.5, turbulence of the interface appears on a surface of the upper magnetic layer to increase the surface roughness, thereby deteriorating the electromagnetic characteristics.

The magnetic recording medium having the upper magnetic layer satisfying the relationship of $0.05 \leq \sigma/d \leq 0.5$ as described above may be prepared from fabrication methods without any particular restriction.

An effective means for producing the magnetic recording medium of the present invention is a wet-on-wet coating system such as described in U.S. Pat. No. 4,844,946. The magnetic recording medium satisfying the relationship of $0.05 \leq \sigma/d \leq 0.5$ is easily obtained in satisfactory yield by applying the upper magnetic layer to the lower non-magnetic layer while the lower non-magnetic layer is still in a wet state. However, the present invention is not limited to the wet-on-wet coating system, and a wet-on-dry coating system such as described in U.S. Pat. Nos. 2,819,186, 3,440,091 and 4,708,906 may be employed as long as the relationship of $0.05 \leq \sigma/d \leq 0.5$ is satisfied.

For example, a dispersion containing a non-magnetic particle dispersed in a binder, such as described in JP-A-4-325917, has thixotropy, in which a ratio ($A10^4/A10$), a ratio of shear stress $A10^4$ determined at a shear rate of $10^4$ sec$^{-1}$ to a shear stress $A10$ determined at a shear rate of $10$ sec$^{-1}$ is adjusted to $100 \geq A10^4/A10 \geq 3$.

As specific means for giving such thixotropy, the following four techniques such as described in JP-A-4-325917 can be applied.

(1) The particle of the lower non-magnetic layer contains carbon black and an inorganic particle smaller in mean primary particle size than the dried thickness of the lower non-magnetic layer, and each of the lower non-magnetic layer and the upper magnetic layer contains a thermosetting polyisocyanate in an amount of 10 to 70% by weight of the binder in each respective layer.

(2) The particle of the lower non-magnetic layer contains a non-metallic inorganic particle having a mean primary particle size of 0.08 μm or less.

(3) A magnetic particle is used which gives such thixotropy that the upper magnetic layer has a dried thickness of 1.0 μm or less and the lower non-magnetic layer has a maximum magnetic flux density Bm of 30 to 500 gausses, provided that the lower non-magnetic layer is not related to the recording.

(4) The upper magnetic layer contains a ferromagnetic particle having a length in the long axis of 0.3 μm or less and a crystallite size of 300 Å or less, the lower non-magnetic layer contains a non-magnetic metal oxide particle and carbon black having a mean particle size of less than 20 nm as the non-magnetic particle at a ratio of 95/5 to 60/40, and the lower non-magnetic layer contains at least a polyurethane and polyisocyanate compound having three -OH groups per molecule.

Further, the following techniques can be applied which allow no mixed region to exist between the lower non-magnetic layer and the upper magnetic layer, such as disclosed in JP-A-4-325915.

(5) The lower non-magnetic layer contains a non-magnetic particle having a ratio ($r_1/r_2$) of the longest axial length $r_1$ to the shortest axial length $r_2$ of 2.5 or more.

(6) The non-magnetic particle has an acicular ratio of 2.5 or more, and a mean particle size of the longest axial length of the ferromagnetic particle is 0.3 μm or less.

(7) A scaly non-magnetic particle and an epoxy group-containing binder having a molecular weight of 30,000 or more are added to the lower non-magnetic layer, and an acicular ferromagnetic particle or a plate-like ferromagnetic particle is added to the upper magnetic layer.

Furthermore, the relationship between the ferromagnetic particle contained in the upper magnetic layer and the non-magnetic particle contained in the lower non-magnetic layer, such as disclosed in Japanese Patent Application No. 4-21782, can also be applied.

(8) The non-magnetic particle contained in the lower non-magnetic layer contains an inorganic particle having a Mohs' hardness of 3 or more, the ferromagnetic particle contained in the upper magnetic layer is acicular, and the mean particle size of the inorganic particle is ½ to 4 times as much as the crystallite size of the acicular ferromagnetic particle.

(9) The non-magnetic particle contained in the lower non-magnetic layer contains an inorganic particle having a Mohs' hardness of 3 or more, the ferromagnetic particle contained in the upper magnetic layer is acicular, and the mean particle size of the inorganic particle is one-third or less of the length in the long axis of the acicular ferromagnetic particle.

(10) The upper magnetic layer contains a hexagonal plate-like ferromagnetic particle whose axis of easy magnetization is arranged perpendicularly to a flat plate, and the non-magnetic particle contained in the lower non-magnetic layer contains an inorganic particle whose mean particle size is less than the plate size of the ferromagnetic particle contained in the upper magnetic layer.

(11) The inorganic particle contained in the lower non-magnetic layer contains an inorganic non-magnetic particle having a surface layer coated with an inorganic oxide.

Moreover, the technique, such as disclosed in Japanese Patent Application No. 4-18419 with respect to a nonmagnetic particle contained in the lower non-magnetic layer, can be used.

(12) The lower non-magnetic layer contains an inorganic particle having a surface layer coated with an inorganic oxide, specifically with an inorganic non-magnetic particle coated with at least one inorganic oxide selected from $Al_2O_3$, $SiO_2$ and $ZrO_2$, in an amount of 1 to 21% by weight for $Al_2O_3$, 0.04 to 20% by weight for $SiO_2$ and 0.05 to 15% by weight for $ZrO_2$ per all amount of the inorganic non-magnetic particle, whereby the dispersibility of the non-magnetic particle contained in the lower non-magnetic layer and the interface can be controlled.

Still further, the following technique disclosed in Japanese Patent Application No. 4-18420 can be used to control the dispersibility of the non-magnetic particle.

(13) A metal oxide treated with a surface treating agent such as an organic acid having a pKa of 3 or less, an epoxy group-containing compound having a molecular weight of 3,000 or less, a silane coupling agent or a titanate coupling agent is used in the lower non-magnetic layer.

In addition, the roughness of the interface can be suitably adjusted by the technique such as disclosed in Japanese Patent Application No. 4-40509.

(14) The non-magnetic particle contained in the lower non-magnetic layer contains a granular inorganic particle (A) having a mean particle size of 0.01 to 0.08 μm, carbon black (B) having a mean particle size of 0.01 to 0.04 μm, and a third component particle (C) coarser than particle (A) and carbon black (B), namely the coarse third component particle (C) contains a granular or polyhedral particle having a mean particle size of 0.07 to less than 1 μm in the lower non-magnetic layer.

Further, suitable unevenness can be formed on the interface by adding non-magnetic particles to the upper magnetic layer.

It is further preferred that the longest diameter, designated as a, of the non-magnetic particles contained in the upper magnetic layer and the thickness d satisfy the relationship of $0.1 \leq a/d \leq 5$. This is conceivably because the upper magnetic layer is contaminated with the relatively large-sized foreign particles, whereby unevenness is intentionally formed to some extent on the interface.

By using these methods in combination of two or more of them, the magnetic layer having the mean total thickness d and the standard deviation σ of the thickness of the present invention can be obtained.

In the present invention, one method for adjusting the standard deviation σ of the thickness of the upper magnetic layer and the mean total thickness d of the upper magnetic layer to $0.05 \leq \sigma/d$, namely for giving moderate unevenness to the upper magnetic layer, is to add the non-magnetic particles to the upper magnetic layer. When the mean particle size of non-magnetic particles is smaller than the thickness of the upper magnetic layer, moderate irregularity can be given to the interface by adding the non-magnetic particles different from the ferromagnetic particle in shape. When the mean particle size of the non-magnetic particles is larger than the thickness of the upper magnetic layer, the non-magnetic particles exist in the vicinity of the interface of the upper magnetic layer and the lower non-magnetic layer, whereby moderate irregularity can be given to the interface without impairing the smoothness of the surface of the upper magnetic layer. When the mean particle size thereof is larger than the thickness of the upper magnetic layer, particularly in the case of the wet-on-wet method, the above-mentioned phenomenon preferably takes place. The non-magnetic particles different from the ferromagnetic particles in shape can be attained by non-magnetic particles remaining even after demagnetizing treatment from the magnetic layer or after low-temperature ashing treatment. In the present invention, the non-magnetic particles contained in the upper magnetic layer are confirmed by the residual particles obtained by demagnetizing a sample of 1 cm×1 cm of the completed magnetic recording medium with 6 N–12 N HCl, followed by $O_2$ plasma treatment with a low-temperature ashing apparatus (manufactured by Yamato Kagaku Co.). This ashing treatment is required to be stopped before reaching at least the lower non-magnetic layer. Materials easily ashed such as carbon black and organic resins are treated under mild conditions. The mean particle size of the non-magnetic particles in this state is preferably from 0.005 to 2 μm, and more preferably from 0.01 to 1.5 μm. The mean particle size is measured by taking a photograph of the non-magnetic particles exposed by the ashing treatment at a magnification of ×30,000 under a scanning electron microscope (SEM) and processing the longest diameter of the non-magnetic particles on the photograph with IBAS 1 image processor (manufactured by Zeiss Co.).

The upper magnetic layer thus contains the non-magnetic particles which remain even after demagnetizing treatment and low-temperature ashing treatment, whereby suitable unevenness can be intentionally formed on the interface. The demagnetizing treatment is conducted to distinguish the non-magnetic particles from the ferromagnetic particle. The ashing treatment is carried out to distinguish the non-magnetic particles from the binder and confirm that the particle keep their form in the binder.

The non-magnetic particles which are added to the upper magnetic layer of the present invention may be either inorganic particles or organic particles. Carbon black may be also used.

Examples of the non-magnetic inorganic particles which are added to the upper magnetic layer of the present invention are non-magnetic inorganic particles of metal, metal oxide, metal carbonate, metal sulfate, metal nitride, metal carbide, and metal sulfide. Specifically, they include $TiO_2$ (rutile, anatase), TiOx, cerium oxide, tin oxide, tungsten oxide, chromium oxide, titanium oxide, ZnO, $ZrO_2$, $SiO_2$, $Cr_2O_3$, α-alumina having an α-conversion of 90% or more, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $CaSO_4$, $BaSO_4$, silicon carbide, titanium carbide, artificial diamond, and silicon dioxide. These particles are used singly or in combination of two or more of them.

The mean particle size of the non-magnetic particles is preferably from 0.005 to 2 μm. However, the shape thereof is not particularly limited. Different kinds of inorganic particles can be used in combination of two or more, if desired. If a single kind of an inorganic particle is used, the distribution of particle diameters can be properly selected.

As the inorganic particles mentioned above, those having the properties mentioned below are preferred. Preferred particles are those having a tap density (measured under the condition of numbers of tapping: 150 and head 30 mm, using Tap density measuring instrument manufactured by Seishin Enterprise Inc.) of 0.05 to 2 g/ml, preferably 0.2 to 1.5 g/ml; a water content of 0.1 to 5%, preferably from 0.2 to 3%; a pH value of 2 to 11; a specific surface area of 1 to 100 m²/g, preferably 5 to 50 m²/g, more preferably 7 to 40 m²/g; a crystallite size of 0.01 to 2 μm; an oil absorption with DBP of 5 to 100 ml/100 g, preferably 10 to 80 ml/100 g, more preferably 20 to 60 ml/100 g; and a specific gravity of 1 to 12, preferably 2 to 8.

The shape thereof may be acicular, spherical, cubic, or plate-like shapes.

The inorganic particles need not necessarily be 100% pure. For instance, in accordance with the object desired, the surfaces of these particles may be treated with other compounds such as compounds of Al, Si, Ti, Zr, Sn, Sb and/or Zn to form oxides thereof on the surfaces thereof. In this case, the purity of the substrate particles can be 70% by weight or more so as not to reduce the effect of them. For instance, when titanium oxide is used as the inorganic particle, the surface is generally treated with alumina. The ignition loss of the particles is desired to be 20% or less. The Mohs' hardness of the inorganic particles is desired to be 4 or more.

Of these inorganic particles, preferred are abrasives which are known materials having a Mohs' hardness of 6 or higher such as s-alumina having an a conversion of 90% or more, β-alumina, silicon carbide, chromium oxide, cerium oxide, α-iron oxide, corundum, artificial diamond, silicon nitride, silicon carbide, titanium carbide, titanium oxide, silicon dioxide, or boron nitride. These are used alone or in combination. A composite of such abrasives (i.e., abrasives treated with other abrasives) may be used. These abrasives may contain some compounds or elements other than the chief ingredient, and the effects of the abrasives remain unchanged if the chief ingredient is 90% by weight or more.

The abrasives are desired to have a particle size of 0.01 to 2 μm. If desired, a combination of plural abrasives each having a different particle size may be employed in the present invention. As the case may be, a single abrasive having a broad particle size distribution may also be used to attain the same effect. The abrasives are desired to have a tap density of 0.3 to 2 g/ml, a water content of 0.1 to 5%, a pH value of 2 to 11, and a specific surface area of 1 to 30 $m^2/g$.

The abrasives may have any of acicular, spherical, cubic, or plane-like shapes. Abrasives in which a part of their shape has an edge are preferably used, because the abrasive property thereof becomes higher.

The abrasives may previously be dispersed in a binder prior to its addition into the magnetic coating solution. The amount of the abrasive, particles present in the surface of the upper magnetic layer and the edges of the medium of the present invention is preferably 5 particles/100 $\mu m^2$ or more.

Specific examples of the non-metalic particles which are added to the upper magnetic layer of the present invention include UA5600 and UA5605 manufactured by Showa Denko K.K.; AKP-20, AKP-30, AKP-50, HIT-50, HIT-55, HIT-100 and ZA-G1 manufactured by Sumitomo Chemical Co., Ltd.; G5, G7 and S-1 manufactured by Nippon Chemical Industrial, Co., Ltd.; TF-100, TF-120, TF-140 and R516 by Toda Kogyo Corp.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680 and TY-50 manufactured by Ishihara Sangyo Kaisha Ltd.; ECT-52, STT-4D, STT-30D, STT-30 and STT-65C manufactured by Titan Kogyo K.K.; T-1 manufactured by Mitsubishi Materials Corp.; NS-0, NS-3Y and NS-8Y manufactured by Nippon Shokubai Kagaku Co., Ltd.; MT-100S, MT-100T, MT-150W, MT-500B, MT-600B and MT-100E manufactured by Teika K.K.; FINEX-25, BF-1, BF-10, BF-20, BF-1L and BF-10P manufactured by Sakai Chemical Industry Co. Ltd.; DEFIC-Y and DEFIC-R manufactured by Dowa Mining Co., Ltd.; and Y-LOP manufactured by Titan Kogyo K.K.

Particularly preferred are AKP-20, AKP-30, AKP-50, HIT-50 and HIT-100 manufactured by Sumitomo Chemical Co., Ltd.; G5, G7 and S-1 manufactured by Nippon Chemical Industrial Co., Ltd.; and TF-100 and TF-140 manufactured by Toda Kogyo Corp.

Examples of the carbon black which is added to the upper magnetic layer of the present invention include furnace black for rubber, thermal black for rubber, carbon black for coloration and acetylene black. It is preferred that a specific surface area is from 5 to 500 $m^2/g$, preferably from 10 to 400 $m^2/g$; a DBP oil absorption is from 20 to 400 ml/100 g, preferably from 30 to 200 ml/100 g; a mean particle size is from 5 to 300 mμ, preferably from 10 to 50 mμ, more preferably from 10 to 40 mμ; a pH value is from 2 to 10; a water content is from 0.1 to 10%; and a tap density is from 0.1 to 1 g/ml.

Specific examples of the carbon black include BLACK-PEARLES 2000, 1300, 1000, 900, 800, 880, 700 and VULCAN XC-72 manufactured by Cabot Co., Ltd.; #80, #60, #55, #50, #35 manufactured by Asahi Carbon Co., Ltd.; #3050B, #3150B, #3250B, #3750B, #3950B, #2400B, #2300, #1000, #970B, #950, #900, #850B, #650B, #40, #30, #10B and MA-600 manufactured by Mitsubishi Kasei Corp.; CONDUCTEX SC manufactured by Columbia Carbon Co., Ltd.; 8800, 8000, 7000, 5750, 5250, 3500, 2100, 2000, 1800, 1500, 1255, 1250, 150, 50, 40 and 15 manufactured by RAVEN Co., Ltd.; and Ketjen Black EC manufactured by Agzo Co., Ltd. The carbon black may be surface-treated with a dispersing agent or may be grafted with a resin to partially graphatize the surface of it. If desired, the carbon black may previously be dispersed in a binder prior to its addition to the non-magnetic coating solution for the upper magnetic layer.

The carbon black in the upper magnetic layer can be used within the range not exceeding 50% by weight based on the inorganic particles therein and within the range not exceeding 40% by weight based on the total weight of the upper magnetic layer. The amount of the carbon black is preferably from 0.1 to 30% by weight based on the amount of the ferromagnetic particle in the upper magnetic layer. The carbon black may be used singly or in combination of two or more of them. The carbon black acts for prevention of static charges, reduction of friction factor, impartation of light-shielding property and elevation of film strength. The action differs between the kinds of the carbon black to be used.

For the carbon black for use in the upper magnetic layer of the present invention, for example, the disclosure of *Carbon Black Handbook* (published by Carbon Black Association) may be referred to.

Examples of the non-magnetic organic particles which are added to the upper magnetic layer of the present invention include an acrylstyrene resin powder, a benzoguanamine resin powder, a melamine resin powder and a phthalocyanine pigment powder. Also usable organic powders are a polyolefin resin powder, a polyester resin powder, a polyamide resin powder, a polyimide resin powder, and a polyethylene fluoride resin powder. For methods of producing these powders, JP-A-62-18564 and JP-A-60-255827 may be referred to.

The amount of the inorganic and/or organic non-magnetic particles in the upper magnetic layer of the present invention is from 0.01 to 30 parts by weight, preferably from 0.1 to 20 parts by weight, per 100 parts by weight of the ferromagnetic particles in the upper magnetic layer. Further, it is preferred that the proportion of the non-magnetic particles in the upper magnetic layer is from 20 to 0.1 by weight and from 10 to 0.1 by volume, based on the binder in the upper magnetic layer.

Of the non-magnetic particles, the length of the short diameter b of particle having the longest diameter a is generally from 0.005 to 0.5 μm, preferably from 0.01 to 0.4 μm.

However, means for improving the adhesion of the upper magnetic layer to the lower non-magnetic layer are not necessarily limited to these methods. The upper magnetic layer can be prevented from being separated as long as unevenness is formed on the interface so as to satisfy the relationship of $0.05 \leq \sigma/d \leq 0.5$.

Namely, not only the wet-on-wet system, but also the so-called wet-on-dry system may be employed in which the lower non-magnetic layer is first formed and dried, followed by sequential formation of the upper magnetic layer thereon. If non-magnetic particles having a large mean particle size are added to the lower non-magnetic layer to roughen the surface of the lower non-magnetic layer, the upper magnetic layer may be formed thereon by the wet-on-dry system.

The mean total thickness d and the standard deviation σ described above are determined in the following manner.

The magnetic recording medium is longitudinally cut out with a diamond cutter, and a photograph is taken at a magnification of ×10,000 to ×100,000, preferably ×20,000 to ×50,000, under a transmission electron microscope. Giving attention to the difference in shape between the ferromagnetic particles and the non-magnetic particles contained in the upper magnetic layer and the lower non-magnetic layer, an interface is visually bordered in black and a surface of the upper magnetic layer is similarly bordered in black. The spacing between both of the bordered lines is measured with IBAS 2 image processor (manufactured by Zeiss, Co.) longitudinally at 4 to 14 places per cm in the photograph of the sample (namely, longitudinally at intervals of 0.01 to 0.1 μm in actual length). The mean thickness d and the standard deviation σ can be determined according to the ordinary statistical calculation.

The relationship of $0.05 \leq \sigma/d \leq 0.5$ means that both of the bordered lines are continuous curves having moderate unevenness as a whole with no break, no abrupt rising and no sharp fall.

Specifically, it is preferred that the unevenness relationship between both of the curves is within such a range that the ratio (ΔT/d), wherein the ratio is a difference (ΔT) between a maximum value and a minimum value of the measured total thicknesses of the upper magnetic layer to the mean total thickness d of the upper magnetic layer, can be specified to $0.001 \leq \Delta T/d \leq 0.5$, preferably to $0.01 \leq \Delta T/d \leq 0.3$.

In the present invention, since the unevenness of the bordered lines is controlled so as to satisfy the relationship of $0.05 \leq \sigma/d \leq 0.5$, physical interfacial adhesion between the upper magnetic layer and the lower non-magnetic layer becomes strong and the unevenness of the surface of the upper magnetic layer is moderately formed. The running durability can therefore be ensured.

In the present invention, a coercive force in a direction in which the coercive force is the highest in a plane of the upper magnetic layer parallel to a plane of the non-magnetic support is preferably from 1,000 to 3,000 Oe (oersted), more preferably from 1,200 to 2,500 Oe, and a saturation magnetization per $cm^2$ of the upper magnetic layer in the plane direction is preferably from 0.002 to 0.015 emu, more preferably from 0.003 to 0.01 emu.

The coercive force in the direction in which the coercive force is the highest in the plane of the upper magnetic layer means the highest value obtained by measuring the coercive force in the plane of the magnetic layer, and is approximately equal to the coercive force in a coating, orientation direction, in the case of usual flexible media. Specifically, if the coercive force is less than 1,000 Oe, the recording demagnetization is increased to cause a reduction in high frequency output and a decrease in optimum recording current, which gives trouble in interchangeability. On the other hand, if the coercive force exceeds 3,000 Oe, effective recording becomes difficult due to the restriction of the recording head capacity, and a problem is encountered with regard to overwrite aptitude.

If the saturation magnetization is less than 0.002 emu/$cm^2$, both the high and low frequency outputs are lowered. On the other hand, if the saturation magnetization more than 0.015 emu/$cm^2$, the dispersibility is extremely deteriorated, resulting in insufficient surface properties.

Furthermore, a coercive force of the upper magnetic layer in a direction perpendicular to the plane of the non-magnetic support is from 900 to 5,000 Oe, and a saturation magnetization per $cm^2$ of the upper magnetic layer in the perpendicular direction is preferably from 0.001 to 0.014 emu, more preferably from 0.002 to 0.01 emu. The perpendicular coercive force is a value of coercive force component perpendicular to a film face, and exists in either oblique orientation or longitudinal orientation.

If the coercive force is less than 900 Oe, no high frequency output can be obtained. In the meantime, if the coercive force exceeds 5,000 Oe, no effective recording can be achieved due to the restriction of the recording head capacity.

If the saturation magnetization is less than 0.001 emu/$cm^2$, the reproduced output is unfavorably lowered. Further, if the saturation magnetization is more than 0.014 emu/$cm^2$, the surface properties of the magnetic layer is deteriorated, unfavorably resulting in insufficient reproduced output and S/N ratio (i.e., signal to noise ratio).

The plane or perpendicular coercive force and the saturation magnetization means raw values measured with a vibration sample type magnetic flux meter (VSM, for example, manufactured by Toei Kogyo Co.), and are measured at an Hm of 5 kOe.

In the present invention, there is no particular restriction on concrete means for preparing the magnetic layer having the characteristics, but the ferromagnetic particle may be specified.

Specifically, it is preferred that the ferromagnetic particle used in the upper magnetic layer is acicular or plate-like. When the ferromagnetic particle is acicular, the acicular ratio (the length in the long axis/the length in the short axis) is generally from 3 to 20, preferably from 5 to 12; and the length in the long axis is generally 0.3 μm or less, preferably 0.27 μm or less. The length in the long axis is a mean length in the long axis of 500 particles determined according to a photograph taken at a magnification of ×60,000 to ×100,000 under a transmission electron microscope.

When the ferromagnetic particle is plate-like, preferred is a hexagonal tabular shape ferromagnetic particle having an axis of easy magnetization perpendicular to a plate face.

The non-magnetic particles which are added to the lower non-magnetic layer of the present invention may be either inorganic particles or organic particles.

Examples of the non-magnetic inorganic particles which are added to the lower non-magnetic layer of the present invention are non-magnetic inorganic particles of metal, metal oxide, metal carbonate, metal sulfate, metal nitride, metal carbide, and metal sulfide. Specifically, they include $TiO_2$ (rutile, anatase), TiOx, cerium oxide, tin oxide, tungsten oxide, chromium oxide, titanium oxide, ZnO, $ZrO_2$, $SiO_2$, $Cr_2O_3$, α-alumina with alphatization of 90% or more, βalumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $CaSO_4$, $BASO_4$, silicon carbide, titanium carbide, artificial diamond, silicon dioxide. These particles are used singly or in combination of two or more of them.

The mean particle size of the inorganic particle is preferably from 0.005 to 2 μm. However, the shape thereof is not particularly limited. Different kinds of inorganic particles can be used in combination of two or more of them, if desired. If a single kind of an inorganic particle is used, the distribution of particle diameters can be properly selected.

As the inorganic particles mentioned above, those having the properties mentioned below are preferred. Preferred particles are those having a tap density (measured under the condition of numbers of tapping: 150 and head 30 mm, using Tap density measuring instrument manufactured by Seishin Enterprise Inc.) of 0.05 to 2 g/ml, preferably 0.2 to 1.5 g/ml; a water content of 0.1 to 5%, preferably 0.2 to 3%; a pH value of 2 to 11; a specific surface area of 1 to 100 $m^2/g$, preferably 5 to 50 $m^2/g$, more preferably 7 to 40 $m^2/g$; a crystal unit size of 0.01 μm to 2 μm; an oil absorption with DBP of 5 to 100 ml/100 g, preferably 10 to 80 ml/100 g, more preferably 20 to 60 ml/100 g; and a specific gravity of 1 to 12, preferably 2 to 8.

The shape thereof may be acicular, spherical, cubic, or plate-like shapes.

The inorganic particles need not necessarily be 100% pure. For instance, in accordance with the object desired, the surfaces of these particles may be treated with other compounds such as compounds of Al, Si, Ti, Zr, Sn, Sb and/or Zn to form oxides thereof on the surfaces thereof. In this case, the purity of the substrate particles can be 70% by weight or more so as not to reduce the effect of them. For instance, when titanium oxide is used as the inorganic particle, the surface is generally treated with alumina. The ignition loss of the inorganic particles is desired to be 20% or less. The Mohs' hardness of the inorganic particles is desired to be 4 or more.

The abrasives which are referred to as examples of the non-magnetic particles for use in the upper magnetic layer can be used for the lower non-magnetic layer as the non-magnetic particles.

Specific examples of the non-metalic particles which are added to the lower non-magnetic layer of the present invention include UA5600 and UA5605 manufactured by Showa Denko K.K.; AKP-20, AKP-30, AKP-50, HIT-50, HIT-55, HIT-100 and ZA-G1 manufactured by Sumitomo Chemical Co., Ltd.; G5, G7 and S-1 manufactured by Nippon Chemical Industrial Co., Ltd.; TF-100, TF-120, TF-140 and R516 by Toda Kogyo Corp.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680 and TY-50 manufactured by Ishihara Sangyo Kaisha Ltd.; ECT-52, STT-4D, STT-30D, STT-30 and STT-65C manufactured by Titan Kogyo K.K.; T-1 manufactured by Mitsubishi Material Co., Ltd.; NS-O, NS-3Y and NS-8Y manufactured by Nippon Shokubai Kagaku Co., Ltd.; MT-100S, MT-100T, MT-150W, MT-500B, MT-600B and MT-100E manufactured by Teika K.K.; FINEX-25, BF-1, BF-10, BF-20, BF-1L and BF-10P manufactured by Sakai Chemical Industry Co. Ltd.; DEFIC-Y and DEFIC-R manufactured by Dowa Mining Co., Ltd.; and Y-LOP manufactured by Titan Kogyo K.K.

Particularly preferred are AKP-20, AKP-30, AKP-50, HIT-50 and HIT-100 manufactured by Sumitomo Chemical Co., Ltd.; G5, G7 and S-1 manufactured by Nippon Chemical Industrial Co., Ltd.; and TF-100 and TF-140 by Toda Kogyo Corp.

Examples of the carbon black which is added to the lower non-magnetic layer of the present invention include furnace black for rubber, thermal black for rubber, carbon black for coloration and acetylene black. It is preferred that a specific surface area is from 5 to 500 $m^2/g$, preferably from 150 to 400 $m^2/g$; a DBP oil absorption is from 10 to 400 ml/100 g, preferably from 30 to 200 ml/100 g; a mean particle size is from 5 to 300 mμ, preferably from 10 to 50 mμ, more preferably from 10 to 40 mμ; a pH value is from 2 to 10; a water content is from 0.1 to 10%; and a tap density is from 0.1 to 1 g/ml.

Specific examples of the carbon black include BLACK-PEARLES 2000, 1300, 1000, 900, 800, 880, 700 and VULCAN XC-72 manufactured by Cabot Co., Ltd.; #80, #60, #55, #50, #35 manufactured by Asahi Carbon Co., Ltd.; #3050B, #3150B, #3250B, #3750B, #3950B, #2400B, #2300, #1000, #970B, #950, #900, #850B, #650B, #40, #30, #10B and MA-600 manufactured by Mitsubishi Kasei Corp.; CONDUCTEX SC manufactured by Columbia Carbon Co., Ltd.; 8800, 8000, 7000, 5750, 5250, 3500, 2100, 2000, 1800, 1500, 1255 and 1250 manufactured by RAVEN Co., Ltd.; and Ketjen Black EC manufactured by Agzo Co., Ltd. The carbon black may be surface-treated with a dispersing agent or may be grafted with a resin to partially graphatize the surface of it. If desired, the carbon black may previously be dispersed in a binder prior to its addition to the non-magnetic coating solution for the lower non-magnetic layer.

The carbon black in the lower non-magnetic layer can be used within the range not exceeding 50% by weight based on the inorganic particles therein and within the range not exceeding 40% by weight based on the total weight of the lower non-magnetic layer. The carbon black may be used singly or in combination of two or more of them.

With reference to specific examples of the carbon black, *Carbon Black Handbook* (published by Carbon Black Association) is helpful.

Examples of the non-magnetic organic particles which are added to the lower non-magnetic layer of the present invention include an acryl-styrene resin particle, a benzoguanamine resin particle, a melamine resin particle and a phthalocyanine pigment particle. Also usable organic particles are a polyolefin resin particle, a polyester resin particle, a polyamide resin particle, a polyimide resin particle, and a polyethylene fluoride resin particle. For methods of producing these particles, JP-A-62-18564 and JP-A-60-255827 may be referred to.

The proportion of the inorganic and organic non-magnetic particles used in the lower non-magnetic layer of the present invention is generally from 20 to 0.1 by weight and from 10 to 0.1 by volume, based on the amount of binder in the lower non-magnetic layer.

Provision of a conventional undercoating layer for a magnetic recording medium is also preferably effected. The purpose of the undercoating layer is to improve the adhesiveness between the support and the overlying layers including the magnetic layer. The thickness of the undercoating layer is 0.5 μm or less. Therefore, the undercoating layer is different from the lower non-magnetic layer of the medium of the present invention. Also, in the magnetic recording medium of the present invention, provision of such an undercoating layer directly on the non-magnetic support is preferred so as to enhance the adhesiveness between the lower non-magnetic layer and the non-magnetic support.

As the ferromagnetic particle to be used in the upper magnetic layer of the medium of the present invention, known ferromagnetic particles are suitable, such as a magnetic iron oxide γ-FeOx (x=1.33 to 1.5), a Co-modified γ-FeOx (x=1.33 to 1.5), a ferromagnetic alloy particle comprising Fe, Ni or Co (in an amount of 75% or more by weight), a barium ferrite particle and a strontium ferrite particle. Of these, especially preferred is a ferromagnetic alloy particle. The ferromagnetic particle for use in the present invention may contain, in addition to the principal atoms, any other atoms of Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and/or B.

The ferromagnetic particle may previously be treated with a dispersing agent, a lubricant, a surfactant and/or an antistatic agent prior to dispersion, as mentioned below. Such a pre-treatment is described in, for example, JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639 (the term "JP-B" as used herein means an "examined Japanese patent publication"), and U.S. Pat. Nos. 3,026,215, 3,031,341, 3,100,194, 3,242,005 and 3,389,014.

Of these ferromagnetic particles, the ferromagnetic alloy particle may contain a small amount of hydroxide(s) and/or oxide(s). The ferromagnetic alloy for use in the present invention may be prepared by known methods, which are, for example, (a) a method of reducing a composite organic acid salt (essentially, oxalates) with a reducing gas such as hydrogen, (b) a method of reducing iron oxide with a reducing gas such as hydrogen to give Fe or Fe—Co particles, (c) a method of thermal-decomposing a metal carbonyl compound, (d) a method of adding a reducing agent such as sodium borohydride, a hydrophosphite or a hydrazine to an aqueous solution of a ferromagnetic metal to reduce the metal, or (e) a method of vaporizing a metal in a low pressure inert gas to obtain a fine particle of the metal.

The thus-obtained ferromagnetic alloy particle may be subjected to a known gradual oxidation treatment, for example, by (f) a method of dipping the particle in an organic solvent followed by drying, (g) a method of dipping the particle in an organic solvent followed by applying an oxygen-containing gas so as to form an oxide film on the surface thereof and drying the coated particle, or (h) a method of forming an oxide film on the surface of the particle by adjusting the partial pressure of an oxygen gas and an inert gas as applied to the particle without using an organic solvent.

The ferromagnetic particle of the upper magnetic layer of the medium of the present invention has a specific surface area by BET method of generally 25 to 80 m$^2$/g, preferably 35 to 70 m$^2$/g. If the specific surface area is less than 25 m$^2$/g, the noise can be unduly accentuated. If, on the contrary, it is more than 80 m$^2$/g, the surface property would be unfavorably poor.

The crystallite size of the ferromagnetic particle of the upper magnetic layer of the medium of the present invention is generally from 100 to 450 Å, preferably from 100 to 350 Å.

Saturation magnetization $\sigma_s$ of the iron oxide magnetic particle is generally 50 emu/g or more, preferably 70 emu/g or more; and that of the ferromagnetic metal particle for use in the present invention is preferably 100 emu/g or more, more preferably from 110 emu/g to 170 emu/g. The coercive force Hc of the ferromagnetic metal particle is preferably from 1,100 Oe to 2,500 Oe, more preferably from 1,400 Oe to 2,000 Oe. The acicular ratio of the ferromagnetic particle for use in the present invention is preferably 18 or less, more preferably 12 or less.

The ferromagnetic particle is desired to have a r1500 of being generally 1.5 or less, more preferably 1.0 or less. The r1500 indicates the amount of the remanent magnetization (%) without being reversed, when the magnetic recording medium has been subjected to saturated magnetization and then a magnetic field of 1,500 Oe of the reversed direction is applied thereto.

The water content of the ferromagnetic particle is desired to fall within the range of from 0.01 to 2%. Depending upon the kind of the binder to be used along with the ferromagnetic particle, the water content of the particle is desired to be optimized. The tap density of γ-iron oxide for use in the present invention is desired to be preferably 0.5 g/ml or more, more preferably 0.8 g/ml or more. Where an alloy particle is used as the ferromagnetic particle, the tap density thereof is desired to be preferably from 0.2 to 0.8 g/ml. If the tap density is more than 0.8 g/ml, oxidation of the ferromagnetic particle would progress too extensively during the densification of the particle so that a sufficient saturated magnetization ($\sigma_s$) could hardly be attained. If the tap density is less than 0.2 g/ml, dispersion of the particle would often be insufficient.

Where γ-iron oxide is used, the ratio of the divalent iron, if any, to the trivalent iron therein is preferably from 0 to 20%, more preferably from 5 to 10%. The ratio of the cobalt atoms, if any, to the iron atoms is preferably from 0 to 15%, more preferably from 2 to 8%.

The pH value of the ferromagnetic particle is desirably optimized, depending upon its particular combination with the binder. The range of the pH value is generally from 4 to 12, preferably from 6 to 10. The ferromagnetic particle may optionally be surface-treated with agents such as Al, Si, P and/or oxides of them. The amount of the agent for the surface-treatment is from 0.1 to 10 % based on the amount of ferromagnetic particle. The surface-treatment of the particle is preferred, since the adsorption amount of a lubricant such as fatty acids to the particle otherwise may be 100 mg/m$^2$ or less. The ferromagnetic particle often contains soluble inorganic ions such as Na, Ca, Fe, Ni and/or Sr ions. However, such ions have no influence on the characteristics of the particle, provided that the content of them therein is 500 ppm or less.

The ferromagnetic particle for use in the present invention is desired to be less porous, and the porosity in the ferromagnetic particle is desired to be preferably 20% by volume or less, more preferably 5% by volume or less. The shape of the ferromagnetic particle is not specifically defined and may be any of acicular, granular, ellipsoidal or tabular, provided that the particle satisfies the characteristics of the above-mentioned particle size. Where an acicular ferromagnetic particle is used, the acicular ratio thereof is desired to be 12 or less. In order that the ferromagnetic particle for use in the present invention may have SFD (switching field distribution) being 0.6 or less, the distribution of Hc of the ferromagnetic particle is needed to be narrow. To accomplish this, various methods may be employable. For instance, the particle size distribution of goethite is narrowed, sintering of γ-hematite is prevented, and the coating speed of cobalt to iron oxide for cobalt modification is retarded as compared with the conventional methods.

In the present invention, also usable, as hexagonal tabular shape ferrites, are various substituted ferrites such as barium ferrite, strontium ferrite, lead ferrite and calcium ferrite, as well as Co-substituted ferrites and hexagonal Co-ferrite particle. Specifically mentioned are magnetoplumbite type barium ferrite and strontium ferrite, as well as partially spinel phase-containing magnetoplumbite type barium ferrite and strontium ferrite. Of them, especially preferred are substituted ferrites of barium ferrite and strontium ferrite.

Various elements such as Co—Ti, Co—Ti—Zr, Co—Ti—Zn, Ni—Ti—Zn or Ir—Zn may be added to the preceding hexagonal ferrites so as to control their coercive force.

A hexagonal ferrite generally comprises 6-angular tabular particles, and the particle size means the width of the major plane of each 6-angular tabular particle and is measured with an electronic microscope. The particles to be used in the present invention are preferably defined to those having a particle size of 0.01 to 0.2 μm, especially preferably 0.03 to 0.1 μm. The mean thickness (tabular thickness) of the fine particles is preferably from about 0.001 to 0.2 μm, especially preferably from 0.003 to 0.05 μm. The aspect ratio (particle size/tabular thickness) is generally from 1 to 10, preferably from 3 to 7. The fine hexagonal ferrite particle has a specific surface area by BET method ($S_{BET}$) of preferably from 25 to 70 m$^2$/g. In the present invention, the specific surface area is measured at partial pressure of 0.30 by BET one point method (Byck, H. T., Fidiam, J. F.: A. Spell, Paper, No.49, Div. of Colloid Chem., Am. Chem., Soc. Meeting, Chicago, Ill. September 12 (1946)) using a Quantarsorb (manufactured by US Quantarchrome Co., Ltd.) after dehydration at 250° C. for 30 minutes in an atmosphere of nitrogen.

The binder to be used in the present invention for the upper magnetic layer and lower nonmagnetic layer may be selected independently any known thermoplastic resin, thermosetting resin or reactive resin or a mixture of them.

The thermoplastic resin for use in the present invention is one having a glass transition temperature of generally −100° to 150° C., a number mean molecular weight of generally 1,000 to 200,000, preferably from 10,000 to 100,000, and a polymerization degree of approximately 50 to 1,000. Examples thereof include polymers or copolymers comprising constitutive units of vinyl chloride, vinyl acetate, vinyl alcohols, maleic acid, acrylic acid, acrylates, vinylidene chloride, acrylonitrile, methacrylic acid, methacrylates, styrene, butadiene, ethylene, vinyl butyrals, vinyl acetals and/or vinyl ethers, as well as polyurethane resins and various rubber resins. Examples of thermosetting resins and reactive resins for use in the present invention include phenolic resins, epoxy resins, hardening type polyurethane resins, urea resins, melamine resins, alkyd resins, acrylic reactive resins, formaldehyde resins, silicone resins, epoxypolyamide resins, mixtures of polyester resins and isocyanate prepolymers, mixtures of polyester polyols and polyisocyanates, and mixtures of polyurethanes and polyisocyanates.

These resins are described in detail in *Plastic Handbook* (published by Asakura Shoten Co., Ltd,). Known electronic ray-hardening type resins may be incorporated into the lower non-magnetic layer or the upper magnetic layer of the medium of the present invention. Examples thereof including a method of preparation are described in detail in JP-A-62-256219. The resins may be used singly or in combination of them in the present invention. Of these, preferred are a combination of polyurethane resins and at least one selected from the group consisting of vinyl chloride resins, vinyl chloride-vinyl acetate resins, vinyl chloride-vinyl acetate-vinyl alcohol resins and vinyl chloride-vinyl acetate-maleic anhydride co-polymers; and a combination of such resins and polyisocyanates.

Examples of the polyurethane resins for use in the present invention include known polyester polyurethanes, polyether polyurethanes, polyether polyester polyurethanes, polycarbonate polyurethanes, polyester polycarbonate polyurethanes and polycaprolactone polyurethanes. In order to attain even further improved dispersibility and durability, it is preferred, optionally, to introduce into the binders exemplified herein at least one polar group selected from —COOM, —SO$_3$M, —OSO$_3$M, —P=O(OM')$_2$, —O—P=O(OM')$_2$ (wherein M represents a hydrogen atom, an alkali metal, or an ammonium group; M' represents a hydrogen atom, an alkali metal, an ammonium group or an alkyl group), —OH, —NR$_2$, —N+R$_3$ (wherein R$_2$ and R$_3$ each represents a hydrocarbon group), an epoxy group, —SH and —CN by a copolymerization or addition reaction. The amount of such polar groups in the binder, if any, is generally from 1×10$^{-1}$ to 1×10$^{-8}$ eq/g, preferably from 1×10$^{-2}$ to 1×10$^{-6}$ eq/g.

Specific examples of the binders for use in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Co., Ltd.; MPR-TA, MPR-TA5, MPR-TAL, MPR-TSN, MPR-TMF, MPR-TS, MPR-TM, and MPR-TAO manufactured by Nisshin Chemical Industry Co., Ltd.; 1000W, DX80, DX81, DX82, DX83, and 100FD manufactured by Denki Kagaku Kogyo K.K.; MR105, MR110, MR100, and 400X110A manufactured by Nippon Zeon Co., Ltd.; NIPPOLLAN N2301, N2302 and N2304 manufactured by Nippon Polyurethane Co., Ltd.; PANDEX T-5105, T-R3080 and T-5201, VERNOCK D-400 and D-210-80, and CRISVON 6109 and 7209 manufactured by Dainippon Ink & Chemicals, Inc.; BYLON UR8200, UR8300, UR8600, UR5500, UR4300, RV530 and RV280 manufactured by Toyobo Co., Ltd.; DAIPHERAMINE 4020, 5020, 5100, 5300, 9020, 9022 and 7020 manufactured by Dainichiseika Colour & Chemiclas Mfg. Co., Ltd.; MX5004 manufactured by Mitsubishi Kasei Corp.; SUNPRENE SP-150 manufactured by Sanyo Chemical Industries, Ltd.; and SALAN F310 and F210 manufactured by Asahi Chemical Industry Co., Ltd.

The proportion of the binder in the upper magnetic layer of the medium of the present invention is generally from 5 to 50% by weight, preferably from 10 to 30% by weight, based on the ferromagnetic particle therein. Where vinyl chloride resins are used, the proportion is from 5 to 30% by weight; where polyurethane resins are used, it is from 2 to 20% by weight; and where polyisocyanates are used, it is from 2 to 20% by weight. A combination thereof is preferably used.

Where polyurethane resins are used in the present invention, they preferably have a glass transition temperature of −50° to 100° C., a breaking point elongation of 100 to 2000%, a breaking point stress of 0.05 to 10 kg/cm$^2$, and an yield point of 0.05 to 10 kg/cm$^2$.

The magnetic recording medium of the present invention basically comprises two layers of the lower non-magnetic layer and the upper magnetic layer. However, the lower non-magnetic layer and/or the upper magnetic layer may have a multilayer structure and the composition of each of the multilayer may be selected as so desired, as long as they each fulfills the above-mentioned conditions.

It is of course possible to vary the amounts of the ferromagnetic particle, non-magnetic particle and binder, the amounts of vinyl chloride resins, polyurethane resins, polyisocyanates and other resins in the binder, the molecular weight of each resin of constituting the magnetic layer, the amount of the polar groups, if any, in the binder, and the physical characteristics of the resins, in accordance with the needs and circumstances as between the lower non-magnetic layer and the upper magnetic layer.

Examples of the polyisocyanates for use in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine isocyanate, isophorone diisocyanate and triphenylmethane triisocyanate; products of these isocyanates and polyalcohols; and polyisocyanates to be formed by condensation of these isocyanates. As commercial products of these isocyanates, there are CORONATE L, CORONATE HL, CORONATE 2030, CORONATE 2031, MILLIONATE MR, and MILLIONATE MTL manufactured by Nippon Polyurethane Co., Ltd.; TAKENATE D-102, TAKENATE D-110N, TAKENATE D-200, and TAKENATE D-202 manufactured by Takeda Chemicals Industries, Ltd.; and DESMODURE L, DESMODURE IL, DESMODURE N, and DESMODURE HL manufactured by Sumitomo Bayer Co., Ltd. These polyisocyanates can be incorporated into the lower non-magnetic layer and the upper magnetic layer, singly or in combination of two or more of them on the basis of the relative difference in the hardening reactivity between them.

The carbon black for use in the lower non-magnetic layer and the upper magnetic layer constituting the medium of the present invention can be properly selected in any kind, amount and combination depending on the object based on the desired characteristics such as grain size, oil absorption, electric conductance and pH.

The abrasives for use in the lower non-magnetic layer and the upper magnetic layer constituting the medium of the present invention can be properly selected in any kind, amount, and combination depending on the object desired.

To the medium of the present invention may be added various additives, such as those having lubricating effect, antistatic effect, dispersing effect or plasticizing effect.

Examples of additives used in the present invention include molybdenum disulfide; tungsten disulfide; graphite; boron nitride; and graphite fluoride.

Examples of organic lubricants used in the present invention include silicone oils; polar group-containing silicones; fatty acid-modified silicones; fluorine-containing silicones; fluorine-containing alcohols; fluorine-containing esters; polyolefins, polyglycols; alkylphosphates and alkali metal salts thereof; alkylsulfates and alkali metal salts thereof; polyphenyl ethers; fluorine-containing alkylsulfates and alkali metal salts thereof; monobasic fatty acids having from 10 to 24 carbon atoms (optionally unsaturated or branched) and metal salts thereof (with Li, Na, K, Cu); monohydric, dihydric, trihydric, tetrahydric, heptahydric or hexahydric alcohols having from 12 to 22 carbon atoms (optionally unsaturated or branched); alkoxyalcohols having from 12 to 22 carbon atoms; fatty acid monoesters, fatty acid diesters or fatty acid triesters, each comprising monobasic fatty acid having from 10 to 24 carbon atoms (optionally unsaturated or branched) and any one of monohydric, dihydric, trihydric, tetrahydric, heptahydric or hexahydric alcohols having from 2 to 12 carbon atoms (optionally unsaturated or branched); fatty acid esters of monoalkyl ethers of alkylene oxide polymers; fatty acid amides having from 8 to 22 carbon atoms; and aliphatic amines having from 8 to 22 carbon atoms.

Specific examples thereof include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

In addition, examples of surfactants include nonionic surfactants such as alkylene oxides, glycerins, glycidols and alkylphenol-ethyleneoxide adducts; cationic surfactants such as cyclic amines, ester amides, quaternary ammonium salts, hydantoin derivatives, heterocyclic compounds, phosphoniums or sulfoniums; anionic surfactants of containing acid groups such as carboxylic acid group, sulfonic acid group, phosphoric acid group, sulfate group or phosphate group; and amphoteric surfacrants such as amino acids, aminosulfonic acids, sulfuric acid or phosphoric acid esters of aminoalcohols, and alkylbetains. These surfactants are described in detail in *Surfactant Handbook* (published by Sangyo Tosho Co., Ltd.).

The additives of such lubricants and surfactants for use in the present invention are not necessarily 100% pure. As the case may be, they may contain impurities, in addition to the main component, such as isomers, unreacted materials, side products, decomposed products and oxides. The content of the impurities in the agent is desired to be preferably 30% by weight or less, more preferably 10% or less by weight.

The additives of such lubricants and surfactants for use in the lower non-magnetic layer and the upper magnetic layer constituting the medium of the present invention can be properly selected in any kind, amount, and combination depending on the object desired. For instance, these additives may be incorporated into the necessary layers in such a way that different fatty acids each having a different melting point are incorporated differently in the lower non-magnetic layer and the upper magnetic layer so as to prevent bleeding of the coated layers; that different esters each having a different boiling point or having a different polarity are incorporated therein also so as to prevent bleeding of the coated layers; that the amount of the surfactant to be in the coating solution is controlled to elevate the coating stability; and that the amount of the lubricant is made larger in the lower non-magnetic layer than the upper magnetic layer so as to elevate the lubricating effect. Needless to say, the illustrated embodiments herein are not to be considered limitative.

All or a part of the additives for use in the layers constituting the medium of the present invention may be added to the coating solution at any step of preparing the solutions. For instance, they may be blended with a ferromagnetic particle prior to kneading; they may be added to a mixture of a ferromagnetic particle, a binder and a solvent during the step of kneading them; they may be added during dispersion or after dispersion; or they may be added immediately before coating.

Examples of commercial products of the lubricant for use in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor oil-hardened fatty acids, NAA-42, NAA-44, CATION SA, CATION MA, CATION AB, CATION BB, NYMEEN L-201, NYMEEN L-202, NYMEEN L-202, NYMEEN S-202, NONION E-208, NONION P-208, NONION S-207, NONION K-204, NONION NS-202, NONION NS-210, NONION HS-206, NONION L-2, NONION S-2, NONION S-4, NONION O-2, NONION LP-20R, NONION PP-40R, NONION SP-60R, NONION OP-80R, NONION OP-85R, NONION LT-221, NONION ST-221, NONION OT-221, MONOGURI MB, NONION DS-60, ANON BF, ANON LG, butyl stearate, butyl laurate, and erucic acid manufactured by Nippon Oils & Fats Co., Ltd.; oleic acid manufactured by Kanto Chemical Co., Ltd.; FAL-205, and FAL-123 manufactured by Takemoto Yushi Co., Ltd.; Enujerubu LO, Enujerubu IPM, and Sansosyzer E4030 manufactured by Shin-Nippon Rika Co., Ltd.; TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 manufactured by Shin-Etsu Chemical Co., Ltd.; ARMIDE P, ARMIDE C, and ARMOSLIP CP manufactured by Lion Ahmer Co., Ltd.; DUOMIN TDO manufactured by Lion Fat & Oil Co., Ltd.; BA-41G manufactured by Nisshin Oil Mills Co. Ltd.; and PROFAN 2012E, NEWPOLE PE61, IONET MS-400, IONET MO-200, IONET DL-200, IONET DS-300, IONET DS-1000, and IONET DO-200 manufactured by Sanyo Chemical Industries, Ltd.

The coating solutions for the layers of the medium of the present invention can contain organic solvents in any desired proportion. Examples of the organic solvents include ketones such as acetone, methyl ethyl ketone, methyl isobutyl ketone, diisobutyl ketone, cyclohexanone, isophorone, or tetrahydrofuran; alcohols such as methanol, ethanol, propanol, butanol, isobutyl alcohol, isopropyl alcohol, or methylcyclohexanol; esters such as methyl acetate, butyl acetate, isobutyl acetate, isopropyl acetate, ethyl lactate, or glycol acetate; glycol ethers such as glycol dimethyl ether, glycol monoethyl ether, or dioxane; aromatic hydrocarbons such as benzene, toluene, xylene, cresol, or chlorobenzene; chlorinated hydrocarbons such as methylene chloride, ethylene chloride, carbon tetrachloride, chloroform, ethylene chlorohydrin, or dichlorobenzene; N,N-dimethylformamide; and hexane. These organic solvents are not necessarily 100% pure, and may contain impurities, in addition to the main component, such as isomers, unreacted materials, side products, decomposed products, oxides and water. The content of the impurities therein is desired to be 30% by weight or less, more preferably 10% by weight or less. The organic solvents for use in the upper magnetic layer and the lower non-magnetic layer of constituting the medium of the present invention can be properly selected in any kind, amount, and combination depending on the object desired. As examples of the ways of incorporating the organic solvents to the layers, mentioned are such that a more volatile solvent is used in the lower magnetic layer so as to elevate the surface property; a solvent having a higher surface tension (e.g., cyclohexanone, dioxane) is used in the lower magnetic layer so as to elevate the coating stability; and a solvent having a higher dissolution parameter is used in the magnetic layer so as to elevate the filling density. Needless to say, however, the illustrated examples herein are not limitative.

Regarding the thickness constitution of the magnetic recording medium of the present invention, the mean thickness of the non-magnetic support is generally from 1 to 100 µm, preferably from 6 to 20 µm, more preferably from 0.5 to 10 µm; the mean total thickness of the lower non-magnetic layer is generally from 0.5 to 10 µm, preferably from 1 to 5 µm; and the mean total thickness of the upper magnetic layer is generally more than 0.01 µm to less than 0.3 µm, preferably from 0.02 µm to 0.25 µm, more preferably from 0.03 µm to 0.23 µm. The total thickness of both the upper magnetic layer and the lower non-magnetic layer is 1/100 to 2 times as much as the thickness of the non-magnetic support. An undercoating layer may be provided between the non-magnetic support and the lower non-magnetic layer so as to elevate the adhesion therebetween. The mean thickness of the undercoating layer is generally from 0.01 to 2 µm, preferably from 0.05 to 0.5 µm. A back coating layer may be provided on the surface of the non-magnetic support opposite to the non-magnetic layer. The mean thickness of the back coating layer is generally from 0.1 to 2 µm, preferably from 0.3 to 1.0 µm. Such an undercoating layer and a back coating layer may be conventional ones.

When the lower non-magnetic layer has a multilayer structure, the mean thickness of the lower non-magnetic layer means a total of the thickness of each layer.

When the upper magnetic layer has a multilayer structure, the mean thickness d of the upper magnetic layer means a total of the thickness of each layer.

As the non-magnetic support of the medium of the present invention, usable are any known films of polyesters such as polyethylene terephthalate or polyethylene naphthalate, as well as polyolefins, cellulose triacetate, polycarbonates, polyamides, polyimides, polyamidoimides, polysulfones, aramides or aromatic polyamides. These supports may previously be subjected to corona discharge treatment, plasma treatment, easy adhesion treatment, heat treatment, dust removing treatment, etc. In order to attain the object of the present invention, the non-magnetic support is one having a center line mean surface roughness of generally 0.03 µm or less, preferably 0.02 µm or less, more preferably 0.01 µm or less. In addition, it is desired that the non-magnetic support not only has such a small center line mean surface roughness but also does not have large projections of 1 µm or more. The roughness profile of the surface of the support may be freely controlled in accordance with the size and the amount of the filler to be added to the support, if desired. Examples of the filler include oxides and carbonates of Ca, Si and Ti, as well as organic fine particles of acrylic substances.

The F-5 (i.e., the load at the 5% elongation) value of the non-magnetic support in the tape-running direction is preferably from 5 to 50 kg/mm$^2$, and that in the tape-width direction is preferably from 3 to 30 kg/m$^2$.

In general, the F-5 value in the tape-running (lengthwise) direction is higher than that in the tape-width direction. However, when the strength of the tape in the tape-width direction is desired to be high, this prescription shall not apply.

The thermal shrinkage (percentage) of the non-magnetic support in both the tape-running direction and the tape-width direction at 10° C. for 30 minutes is preferably 3% or less, more preferably 1.5% or less; and the same at 80° C. for 30 minutes is preferably 1% or less, more preferably 0.5% or less. The strength of the support at the breaking point is preferably from 5 to 100 kg/mm$^2$ in the both directions; and the modulus of elasticity of the same is preferably from 100 to 2000 kg/mm$^2$ in the both directions.

The process of producing the magnetic and non-magnetic coating solution for the magnetic recording medium of the present invention comprises at least a kneading step, a dispersing step and optionally a mixing step to be provided before and after the preceding steps. The respective steps each may be composed of two or more stages. In producing the composition, all the raw materials of the ferromagnetic particle, non-magnetic particle, binder, carbon black, abrasive, antistatic agent, lubricant and solvent may be added to the reactor initially at the start of the process or later during the course of the process. The individual raw materials may be divided into plural divisions to be added in two or more steps of the process. For instance, polyurethane is divided into plural divisions and added in the kneading step, the dispersing step, and the mixing step for adjustment of the viscosity after dispersion.

For attaining the object of the present invention, any known conventional technology may of course be employed as a part of the process of producing the magnetic recording medium of the present invention. For instance, in the kneading step, a kneading machine having a strong kneading power, such as a continuous kneader or a pressure kneader, may be employed so as to obtain the magnetic recording medium with high Br of the present invention. Where such a continuous kneader or a pressure kneader is employed, a ferromagnetic particle is kneaded with all or a part (preferably 30% by weight or more) of a binder. For instance, 100 parts by weight of a ferromagnetic particle is blended with from 15 to 500 parts by weight of a binder. The details of the kneading technology are described in JP-A-1-106338 and JP-A-1-79274.

As examples of the apparatus and process for producing the magnetic recording medium of the present invention, which is composed of plural layers coated on a support, the following are referred to.

1. A lower non-magnetic layer is first coated on a support with a gravure coating, roll coating, blade coating or extrusion coating device, which is generally employed for coating a magnetic coating composition, and while the coated lower layer is still wet, an upper magnetic layer is coated thereover with a support-pressing extrusion coating device as illustrated in JP-B-1-416186 and JP-A-60-238179 and JP-A-2-265672.

2. A lower non-magnetic layer and an upper magnetic layer are almost simultaneously coated on a support with one coating head having therewith two coating solution passing slits, as illustrated in JP-A-63-88080, JP-A-2-17921 and JP-A-2-265672.

3. A lower non-magnetic layer and an upper magnetic layer are almost simultaneously coated on a support with a back-up roll-equipped extrusion coating device as illustrated in JP-A-2-174965.

It is preferable that a coating solution for the lower non-magnetic layer comprising the non-magnetic particle dispersed in the binder is coated on the non-magnetic support and then, while the coating solution is still in a wet state, a coating solution for the upper magnetic layer comprising the ferromagnetic particle dispersed in the binder is coated on the lower non-magnetic layer.

In order to prevent lowering of the electromagnetic conversion characteristics of the magnetic recording medium due to aggregation of the ferromagnetic particle coated, it is desired to apply a shearing force to the coating solution in the inside of the coating head by the method described in JP-A-62-95174 and JP-A-1-236968. The viscosity of the coating solution is desired to satisfy the numerical range as disclosed in JP-A-3-8471.

In order to obtain the medium of the present invention, strong orientation is necessary. For this purpose, a solenoid of 1000 G (gauss) or more and a cobalt magnet of 2000 G or more are used in combination. In order that the orientation of the dried medium may be the highest, it is preferred that the medium is previously suitably dried prior to orientation. Where the medium of the present invention is a disc, randomizing orientation is typically necessary.

As calendering rolls to be used in producing the medium of the present invention, usable are heat-resistant plastic rolls made of epoxy, polyimide, polyamide or polyimidoamide resins. Calendering may also be effected between two metal rolls. The calendering temperature is preferably 70° C. or higher, more preferably 80° C. or higher. The linear pressure for calendering is preferably 200 kg/cm or more, more preferably 300 kg/cm or more.

The coefficient of friction against SUS420J of the upper magnetic layer of the magnetic recording medium and that of the opposite surface of the same are preferably 0.5 or less, more preferably 0.3 or less. The surface intrinsic resistance of the upper magnetic layer is preferably from $1 \times 10^4$ to $1 \times 10^{11}$ Ω/sq. In the case that only the lower non-magnetic layer is coated, the surface intrinsic resistance of the non-magnetic layer is preferably from $1 \times 10^4$ to $1 \times 10^8$ Ω/sq. The surface intrinsic resistance of the back coating layer is preferably from $1 \times 10^3$ to $1 \times 10^9$ Ω/sq.

The modulus of elasticity of the upper magnetic layer at 0.5% elongation is preferably from 100 to 2000 kg/mm$^2$ both in the tape-running direction and the tape-width direction; the strength of the layer at the breaking point is preferably from 1 to 30 kg/cm$^2$; the modulus of elasticity of the magnetic recording medium of the present invention is preferably from 100 to 1,500 kg/mm$^2$ in both the tape-running direction and the tape-width direction; the residual elongation of the same is preferably 0.5% or less; the thermal shrinkage (percentage) of the same at every temperature of 100° C. or lower is preferably 1% or less, more preferably 0.5% or less, most preferably 0.1% or less.

The content of the solvent remaining in the upper magnetic layer of the medium of the present invention is preferably 100 mg/m$^2$ or less, more preferably 10 mg/m$^2$ or less; and the amount of the remaining solvent in the upper magnetic layer is desired to be smaller than that in the lower non-magnetic layer.

The percentage of a void of the upper magnetic layer and that of the lower non-magnetic layer each is preferably 30% by volume or less, more preferably 20% by volume or less. The percentage of the void of the layer is preferably low to obtain a high output. As the case may be, the percentage of the void of the lower non-magnetic layer may often be higher than that of the upper magnetic layer, depending upon the object sought. For instance, in the case of a magnetic recording medium for recording data of which repeated use is considered important, the percentage of the voids are preferably high to provide excellent sunning durability.

Regarding the magnetic characteristics of the magnetic recording medium of the present invention as measured in a magnetic field of 5 kOe, the squareness ratio in the tape-running direction is generally 0.70 or more, preferably 0.80 or more, more preferably 0.90 or more. The squareness ratio in the two directions perpendicular to the tape running direction is desired to be 80% or less of that in the tape-running direction. The SFD of the upper magnetic layer is desired to be 0.6 or less.

The center line mean surface roughness (Ra) of the upper magnetic layer is desired to be from 2 nm to 20 nm, and the value is to be suitably defined in accordance with the object sought. For improving the electromagnetic characteristics, Ra is desired to be smaller. However, for improving the running durability, Ra is desired to be larger. RMS surface roughness ($R_{RMS}$) of the upper magnetic layer as obtained by STM evaluation is desired to fall within the range of 3 to 16 nm.

As mentioned above, the magnetic recording medium of the present invention comprises at least one lower nonmagnetic layer and at least one upper magnetic layer. It is easily conceivable to change the physical properties thereof for the lower non-magnetic layer and the upper magnetic layer according to the object desired. For example, an increased modulus of elasticity of the upper magnetic layer improves the running durability, and at the same time a modulus of elasticity of the lower non-magnetic layer lower than that of the upper magnetic layer improves the contact of the magnetic recording medium with a head.

The characteristics of the magnetic recording media of the present invention are summarized as follows:

(1) A high output is obtained:

It is possible to obtain an output about 0 to $\mp$ dB (recording wavelength λ: 0.5 μm) higher than that of ordinary oblique vapor deposition type Co—Ni tapes for Hi8. This corresponds to an output about +6 to +9 dB higher than that of conventional ordinary 8-mm coating type (MP) tapes. Thus, high density recording which has never realized becomes possible.

In digital recording, the occurrence of errors is reduced, whereby allowance to the errors are largely increased.

(2) Having resolution equivalent to that of vapor deposition type tapes in digital recording:

The half-value width $W_{50}$ of the isolated pulse waveform is about 0.5 μm (i.e., less than 0.6 μm). Since the $W_{50}$ of conventional ordinary MP tapes is about 0.7 μm, the resolution is enhanced about 1.4 times, resulting in the resolution equivalent to that of the vapor deposition type tapes.

(3) Excellent in waveform symmetry y in digital recording:

The phase strain of the isolated pulse waveform is small as compared with that of the oblique vapor deposition type tapes, and the regenerative waveform shows approximately perfect symmetry. The waveform symmetry γ is about 20% superior to that of the oblique vapor deposition type tapes (monolayer type). Accordingly, no equalizing circuit for the phase strain of the isolated pulse waveform becomes necessary, and an effective high C/N is obtained. A waveform peak shift is small, and a high margin to the digital errors is obtained.

(4) Excellent in overwrite characteristic in digital recording:

The thickness of the upper magnetic metal layers is reduced to one tenth or less (i.e., less than 0.3 μm) that of conventional magnetic layers, and the overwrite characteristic is far improved to +6 dB or more as compared with the conventional ordinary MP tapes. It becomes possible to comply with an encoding system in which the frequency band is too wide to overwrite on the conventional MP media.

(5) Excellent in long-term shelf life because of the coating type media using the high polymer binders:

The stability is high and the long-term shelf life is excellent as compared with the vapor deposition type tapes, because of the coating type tapes using the high polymer binders, similarly with VHS tapes and 8-mm MP tapes which have hitherto been successfully used. Additives such as binders and various lubricants can also be used, similarly with the conventional coating type tapes, so that the running stability and the running durability are also excellent.

(6) Easily mass-produced because of the coating type media:

The magnetic recording media can be produced with the current simultaneous multi-layer coaters without using particular vacuum evaporators which are required for the production of the vapor deposition type tapes. As is the case with the VHS tapes and the 8-mm tapes, mass production is possible, resulting in excellent supply stability.

The magnetic recording media of the present invention having such characteristics are useful for digital VTR tapes for domestic use and next generation digital VTR tapes for broadcast in the video field, and further for high-capacity tape recording media for computers, namely back-up tapes, and high-capacity tapes for data storage having a capacity of 1.5 times as much as that of conventional tapes. Further, the magnetic recording media of the present invention is useful for high-capacity disk recording media, namely high-capacity floppy disks having a capacity of 20 megabytes or more, and exchangeable disk storage media.

In the audio field, the magnetic recording media of the present invention is useful for ultra-small digital audio tapes and the like. In particular, since the present invention is excellent in half-value width $W_{50}$ and in symmetry γ of the isolated pulse waveform, the magnetic recording media of the present invention is therefore useful for magnetic recording media for digital signal recording of an audio tape, a video tapes, a computer tape, and a floppy disk.

The present invention will be further described in the following examples, but the present invention should not be construed as being limited thereto.

EXAMPLE 1

The coating solutions for the upper magnetic layer in and the lower nonmagnetic layer were prepared accordance with the following formulation.

EXAMPLE 1-1

| Coating solution for lower non-magnetic layer | |
|---|---|
| Inorganic particle $TiO_2$<br>Mean primary particle size: 0.035 μm<br>Crystallite system: rutile<br>$TiO_2$ content: 90% by weight or more<br>Surface treating agent: $Al_2O_3$<br>Specific surface area by BET method:<br>40 m²/g<br>DBP oil adsorption: 27–38 g/100 g<br>pH: 7 | 80 parts |
| Carbon black<br>Mean primary particle size: 16 mμ<br>DBP oil adsorption: 80 ml/100 g<br>pH: 8.0<br>Specific surface area by BET method:<br>250 m²/g<br>Volatile content: 1.5% | 20 parts |
| Vinyl chloride-vinyl acetate-vinyl<br>alcohol copolymer<br>(containing an —$SO_3Na$ group in an<br>amount of $1 \times 10^{-4}$ eq/g; compositional<br>ratio: 86/13/1; polymerization degree:<br>400) | 12 parts |
| Polyester polyurethane resin<br>(neopentyl glycol/caprolactone polyol/<br>MDI = 0.9/2.6/1; containing an —$SO_3Na$<br>group in an amount of $1 \times 10^{-4}$ eq/g) | 5 parts |
| α-$Al_2O_3$ (mean particle size: 0.2 μm) | 5 parts |
| Butyl stearate | 1 part |
| Stearic acid | 1 part |
| Methyl ethyl ketone | 200 parts |
| Coating solution for upper magnetic layer | |
| Finely divided ferromagnetic particle<br>(composition: Fe/Zn/Ni = 92/4/4)<br>Hc: 1,700 Oe<br>Specific surface area by BET method:<br>60 m²/g<br>Crystallite size: 95 Å<br>Particle size in the long axis: 0.20 μm<br>Acicular ratio: 20<br>Saturated magnetization ($σ_s$):<br>113 emu/g | 100 parts |
| Vinyl chloride copolymer<br>(containing an —$SO_3Na$ group in an<br>amount of $5 \times 10^{-4}$ eq/g; polymerization<br>degree: 300) | 12 parts |
| Polyester polyurethane resin<br>(neopentyl/caprolactone polyol/MDI = | 3 parts |

-continued

| | |
|---|---|
| 0.9/2.6/1; containing an —SO₃Na group in an amount of 1 × 10⁻⁴ eq/g) | |
| α-Alumina (mean particle size: 0.2 μm) | 2 parts |
| Carbon black (mean particle size: 0.10 μm) | 0.5 parts |
| Butyl stearate | 1 part |
| Stearic acid | 2 parts |
| Methyl ethyl ketone | 200 parts |

For each of the two coating solutions, the respective components were kneaded by means of a continuous kneader and then dispersed by means of a sand mill. To the dispersions thus obtained were added a polyisocyanate in an amount of 1 part for the coating solution for the lower non-magnetic layer, 3 parts for the coating solution for the upper magnetic layer, and butyl acetate in an amount of 40 parts for each coating solution. The materials were each filtered through a filter having a mean pore size of 1 μm to prepare the coating solutions for the lower non-magnetic layer and the upper magnetic layer.

The coating solution for the lower non-magnetic layer was coated, in a mean dry thickness of 2 μm, on a polyethylene terephthalate support having a thickness of 7 μm and having a center line mean surface roughness of 0.01 μm. Immediately after the coating, the coating solution for the upper magnetic layer was coated, in a predetermined mean dry thickness, on the lower non-magnetic layer to form the upper magnetic layer using a simultaneous multiple layer coating method. While the two layers were wet, the material was oriented under a cobalt magnet having a magnetic force of 3,000 G and a solenoid having a magnetic force of 1,500 G. After being dried, the material was then treated through a 7-stage calender made of only metal rolls at a temperature of 90° C. The material was then slit into 8-mm wide strips to prepare an 8-mm video tape of Example 1-1.

The mean particle size of the non-magnetic particles contained in the upper magnetic layer of the resulting video tape was 0.18 μm.

Similarly, changing the factors described in Table 1, the samples described in Table 1 were prepared.

Examples 1-2 and 1-3

The thickness of the upper magnetic layers was changed.

Comparative Example 1-1

The upper magnetic layer alone was formed without providing the lower non-magnetic layer.

Comparative Example 1-2

The sequential multi-layer coating method was employed in which the coating solution for the lower non-magnetic layer was applied and dried, followed by forming the upper magnetic layer thereon.

Comparative Examples 1-3, 1-4 and 1-6

The thickness of the upper magnetic layers was changed.

Comparative Example 1-5

A commercial Hi-8ME tape manufactured by SONY Corporation was employed.

The above-mentioned samples were evaluated according to the following methods. Results thereof are shown in Table 1 and FIGS. 1 to 3.

TABLE 1

| | | Coating Method Unit | Example 1-1 W.W*1 | Example 1-2 W.W | Example 1-3 W.W | Comparative Example 1-1 monolayer | Comparative Example 1-2 W.D*4 |
|---|---|---|---|---|---|---|---|
| Magnetic Layer | d | μm | 0.28 | 0.15 | 0.02 | 0.15 | 0.15 |
| | σ | μm | 0.08 | 0.03 | 0.01 | 0.006 | 0.007 |
| | σ/d | — | 0.29 | 0.2 | 0.4 | 0.04 | 0.047 |
| | a*2 | μm | 0.2 | 0.2 | 0.2 | 0.2 | 0.2 |
| | a/d | — | 0.71 | 1.33 | 10.0 | 1.33 | 1.33 |
| Non-Magnetic Layer | Thickness | μm | 2.5 | 2.5 | 2.5 | 0 | 2.5 |
| Running | Output*3 | dB | −2 | −2.5 | −3 | −6 | −5 |
| Durability | Clogging | — | none | none | none | found | found |

| | | Coating Method Unit | Comparative Example 1-3 W.W | Comparative Example 1-4 W.W | Comparative Example 1-5 vapor deposition | Comparative Example 1-6 W.W |
|---|---|---|---|---|---|---|
| Magnetic Layer | d | μm | 0.28 | 0.01 | 0.2 | 0.3 |
| | σ | μm | 0.015 | 0.009 | 0.002 | 0.05 |
| | σ/d | — | 0.046 | 0.9 | 0.013 | 0.17 |
| | a*2 | μm | 0.02 | 0.02 | none | 0.2 |
| | a/d | — | 0.07 | 2.00 | — | 0.67 |
| Non-Magnetic Layer | Thickness | μm | 2.5 | 2.5 | 0 | 2.5 |
| Running | Output*3 | dB | −5.6 | −11 | −6 | −2.1 |
| Durability | Clogging | — | found | found | found | none |

*1: Simultaneous multi-layer (wet-on-wet)
*2: The longest size of α-alumina
*3: A drop in output after 100 running passes
*4: Sequential multi-layer (wet-on-dry)

Figure 2:
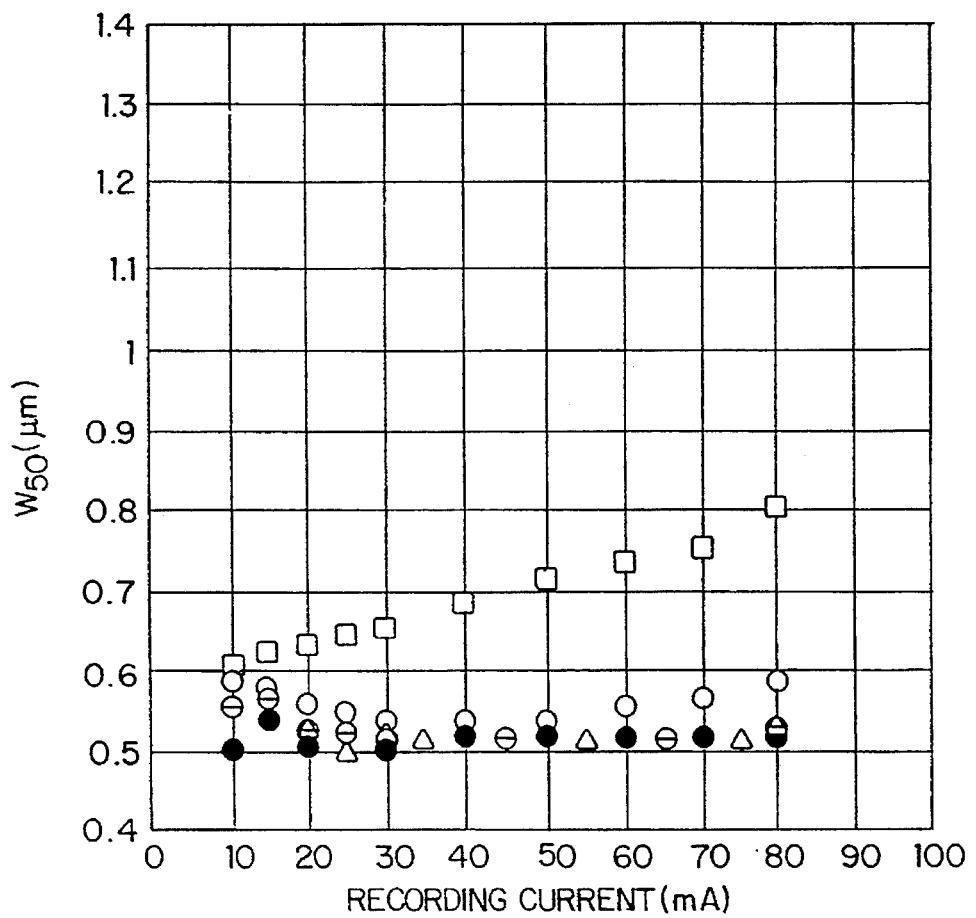
FIG. 2 is a graph showing changes in half-value width $W_{50}$ of the isolated pulse waveform with recording current for video tapes of the present invention and for comparative tapes.
Figure 3:
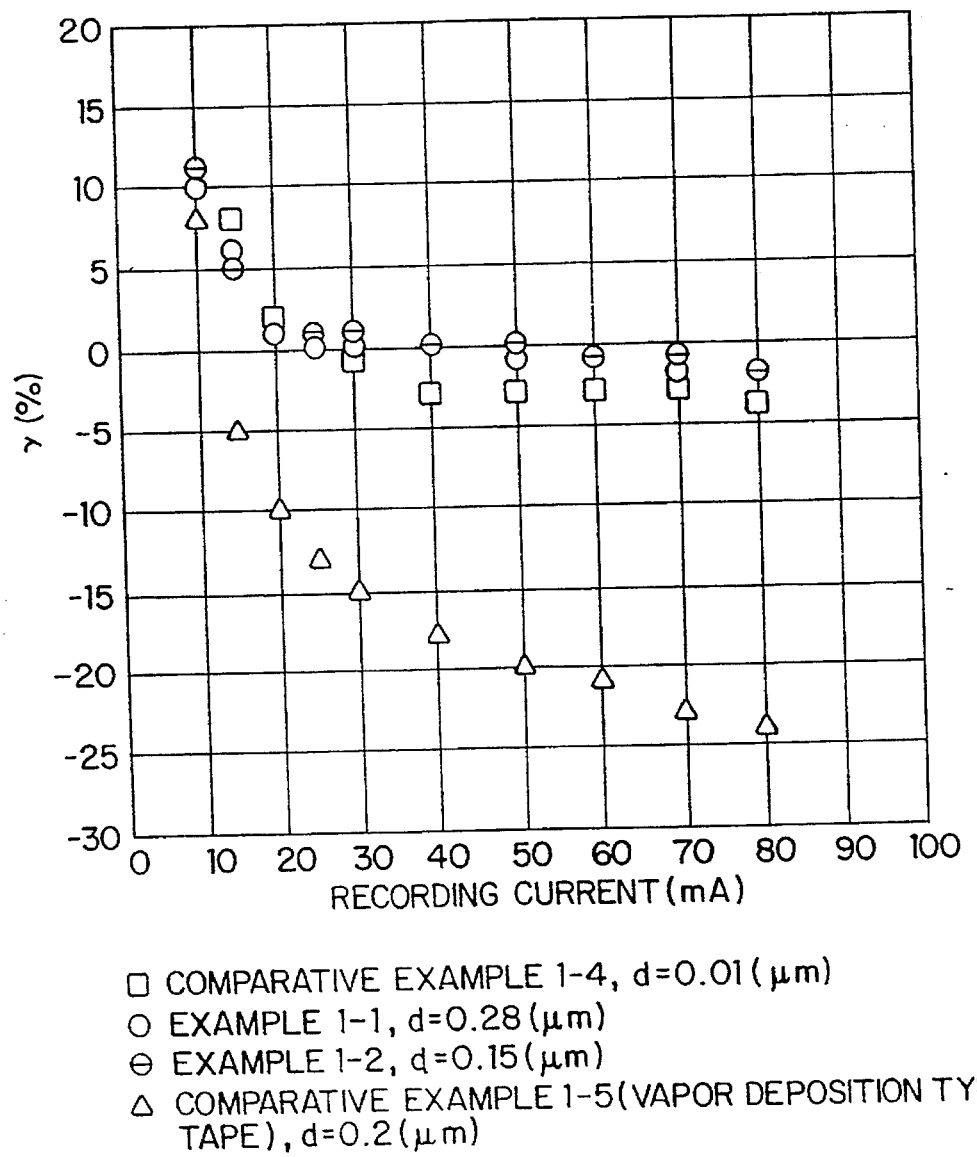
FIG. 3 is a graph showing changes in symmetry γ of the isolated pulse waveform with recording current for video tapes of the present invention and for comparative tapes.
Figure 4:
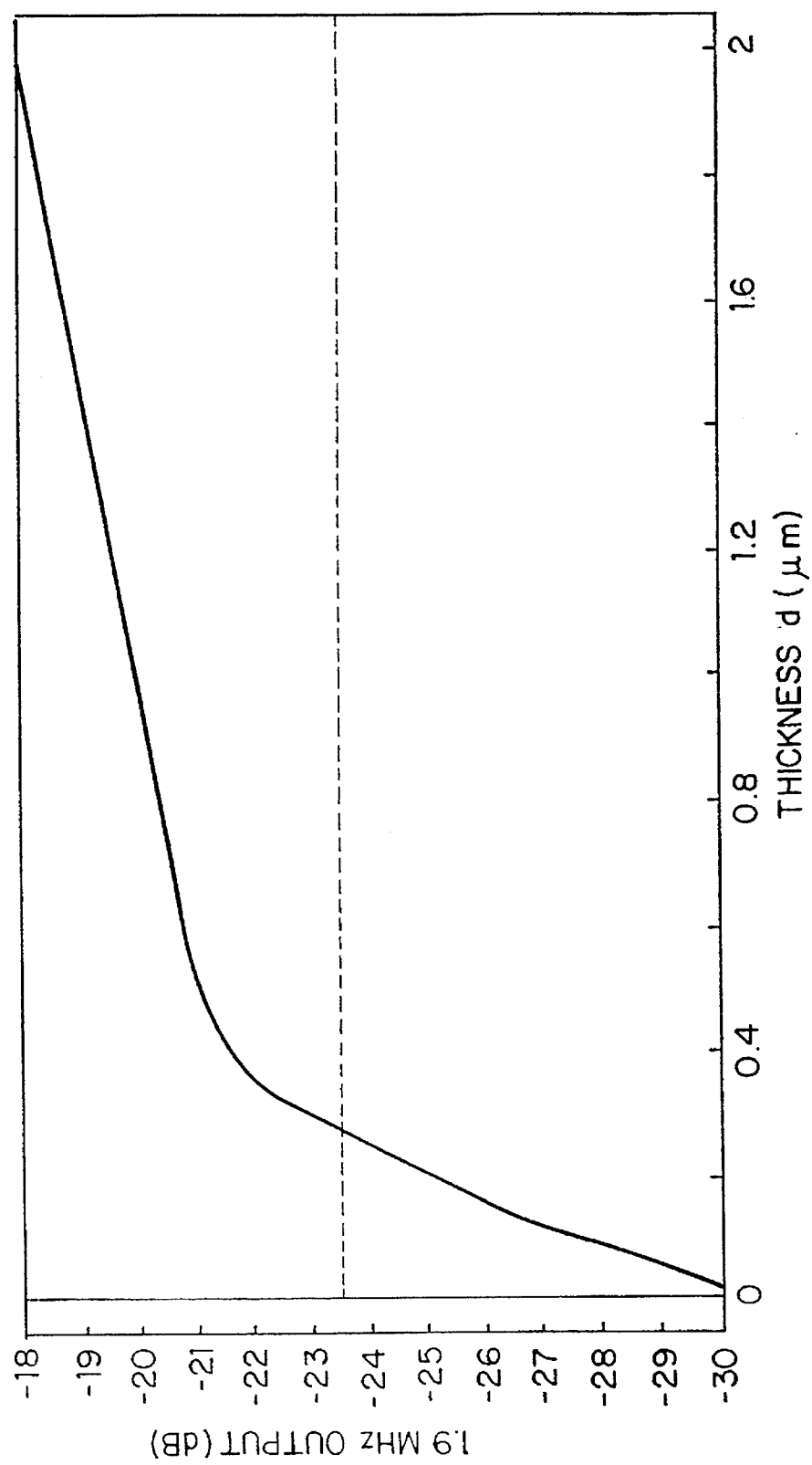
FIG. 4 is a graph showing changes in overwrite aptitude with a mean total thickness d of the upper magnetic layer for video tapes of the present invention and for comparative tapes.

Evaluation Methods (1) Output of isolated pulse waveform, half-value width $W_{50}$ of isolated pulse waveform and symmetry γ of isolated pulse waveform An isolated pulse waveform was measured using an external contact type drum tester. The relative tape speed at the magnetic head was 3.8 m/sec, and the head used was a laminated Sendust head having a gap length of 0.2 μm and a track width of 20 μm. A square wave of 100 kHz was recorded and reproduced with this tester, and its waveform was evaluated. The output peak value thereof, the half-value width $W_{50}$ and symmetry γ of the isolated pulse waveform are shown in FIGS. 1 to 3, respectively. The half-value width $W_{50}$ of the isolated pulse waveform of the recording medium of the present invention was 0.6 μm or less. The symmetry γ thereof at the recording current of 20 mA or more was 10% or less. (2) Overwrite aptitude First, a sine wave of 1.9 MHz was recorded on the above-mentioned samples except for Comparative Example 1-5 after erasing and on other samples (not described in Table 1), using the above-mentioned drum tester, and its output was measured using a spectrum analyzer. Then, after a sine wave signal of 7.6 MHz was recorded thereon, the output of 1.9 MHz was measured again using a spectrum analyzer. The difference therebetween was determined and plotted as is shown in FIG. 4. The larger the difference is, the better the overwrite aptitude is. In a digital recording system in which a recording wavelength is 1 μm or less, it is preferred that the output value is −23.5 dB or less.

(3) Running durability

A sample was run 100 passes by P6-120 on ten 8-mm video decks (FUJIX8, manufactured by Fuji Photo Film Co., Ltd.) in an atmosphere of 23° C. and 70% RH. In the course of running, drops in output were measured. When head clogging continuing for 10 seconds or more was produced during 100 running passes, it was evaluated as "found". When no head clogging or head clogging continuing for less than 10 seconds was produced, it was evaluated as "none".

(4) Measuring methods of d and σ

A magnetic recording medium was longitudinally cut out to a thickness of 0.1 μm with a diamond cutter. The resulting section was observed and its photograph was taken at a magnification of ×10,000 to ×100,000, preferably ×20,000 to ×50,000, under a transmission electron microscope. The print size of the photograph was A4 to A5. Then, giving attention to the difference in shape between ferromagnetic particles and non-magnetic particles contained in the upper magnetic layer and the lower non-magnetic layer, an interface was visually bordered in black and a surface of the upper magnetic layer was similarly bordered in black. Thereafter, the length of the bordered lines was measured with IBAS 2 image processor manufactured by Zeiss, Co. When the length of the sample photograph was 21 cm, it was measured 85 to 300 times. A mean thickness of the measurements was taken as d, and a standard deviation of the thickness of the measurements was taken as σ. d and σ were calculated by the following equations:

$$d = \frac{1}{n} \sum_{i=1}^{n} d_i$$

$$\sigma = \left( \frac{1}{n-1} \sum_{i=1}^{n} (d_i - d)^2 \right)^{1/2}$$

wherein $d_i$ represents each measurement and n represents the number of the measurement. (i.e., 85 to 300).

As is apparent from Table 1 and FIGS. 1 to 3, the magnetic recording media of the present invention having a magnetic layer thickness d satisfying the range of more than 0.01 μm to less than 0.3 μm and a σ/d satisfying the relationship of 0.05σ/d≦0.5 ensure the running durability, and are superior or equivalent to the vapor deposition type tapes and the other comparative tapes in all the electromagnetic characteristics of the output, the half-value width $W_{50}$ of the isolated pulse waveform, the symmetry γ of the isolated pulse waveform and the overwrite aptitude. Further, these results reveal that the magnetic recording media of the present invention are apparently superior to the vapor deposition type tapes in the symmetry γ.

EXAMPLE 2

The coating solutions for the upper magnetic layer and the lower nonmagnetic layer were prepared in accordance with the following formulation.

| Coating solution for upper magnetic layer | |
|---|---|
| Co-substituted barium ferrite | 100 parts |
| Specific surface area by BET method: 35 m²/g | |
| Mean tabular size: 0.06 μm | |
| Tabular ratio: 5 | |
| Vinyl chloride copolymer | 9 parts |
| (containing an —SO$_3$Na group in an amount of 1 × 10$^{-5}$ eq/g; polymerization degree: 300) | |
| Finely divided abrasives | 7 parts |
| (Cr$_2$O$_3$; mean particle size: 0.3 μm) | |
| Toluene | 30 parts |
| Methyl ethyl ketone | 30 parts |

These components were kneaded by a kneader for about 1 hour. The following components were added to the material. The mixture was then subjected to dispersion by a kneader for about 2 hours.

| | |
|---|---|
| Polyester polyurethane resin | 5 parts |
| (Neopentyl glycol/caprolactone polyol/ MDI = 0.9/2.6/1; containing an —SO$_3$Na group in an amount of 1 × 10$^{-4}$ eq/g; a mean molecular weight: 35,000) | |
| Toluene | 200 parts |
| Methyl ethyl ketone | 200 parts |

To the material were then added the following carbon black and coarse particle abrasives. The mixture was then subjected to dispersion by a sand grinder at 2,000 rpm for about 2 hours.

| | |
|---|---|
| Carbon black | 5 parts |
| (mean particle size: 20 to 30 mμ; Ketjen Black EC (manufactured by Lion Agzo Co., Ltd.)) | |
| α-Alumina | 2 parts |
| (AKP-12 manufactured by Sumitomo Chemical Co., Ltd.; the longest size a: 0.5 μm) | |

To the dispersion thus obtained were then added the following compositions. The mixture was then subjected to dispersion by a sand grinder to prepare a coating solution for the upper magnetic layer.

| | |
|---|---|
| Polyisocyanate | 6 parts |
| (Coronate L manufactured by Nippon Polyurethane Co., Ltd.) | |
| Tridecyl stearate | 6 parts |

The coating solution for the lower non-magnetic layer was coated, in a mean dry thickness of 2 μm, on a polyethylene terephthalate support having a thickness of 75 μm.

Immediately after the coating, the coating solution for the upper magnetic layer was coated, in a predetermined mean dry thickness, on the lower non-magnetic layer to form the upper magnetic layer using a simultaneous multiple layer coating method. The side opposite to the support on which the lower non-magnetic and upper magnetic layers were coated was treated in the same may. The magnetic recording medium was obtained from the coated sample by calender treatment.

The magnetic recording medium thus obtained was stamped out to a disk of 3.5 inches in diameter. The disk was housed in a 3.5-inch cartridge provided with an inner liner, and required mechanism elements are attached thereto to obtain a 3.5-inch floppy disk of Example 2-1. The mean particle size of the non-magnetic particles contained in the upper magnetic layer of the floppy disk was 0.22 μm.

Similarly, changing the factors described in Table 2, the samples of Examples 2-2 and 2-3 and Comparative Examples 2-1 to 2-4 were prepared.

Examples 2-2 and 2-3

The thickness of the upper magnetic layers was changed.

Comparative Example 2-1

The magnetic layer alone was formed without providing the lower non-magnetic layer.

Comparative Example 2-2

The sequential multi-layer coating method was employed in which the coating solution for the lower non-magnetic layer was applied and dried, followed by forming the upper magnetic layer thereon.

Comparative Examples 2-3 and 2-4

The thickness of the upper magnetic layers and the longest diameter a of the non-magnetic particles (coarsely grain abrasives) were changed.

The resulting samples were evaluated according to the above-mentioned methods with the exception that the running durability was evaluated by the following method:

Running Durability

Each of the floppy disks was loaded and driven in a floppy disk drive (PD211, manufactured by Toshiba Co., Ltd.), and subjected to carry out a 24-hour thermocycle test in which the following thermocycle flow shown in Table 2 was one cycle, with the head positioned at track 12. The running durability was evaluated by a running state at the time after running 20,000 times under these thermocycle conditions.

Results thereof are shown in Table 3.

TABLE 2

Thermocycle Flow

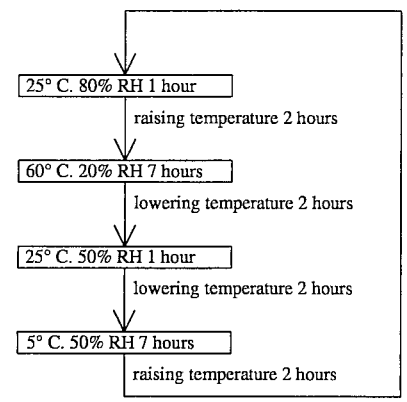

TABLE 3

|  | Coating Method | Unit | Example 2-1 W.W*1 | Example 2-2 W.W | Example 2-3 W.W | Comparative Example 2-1 monolayer | Comparative Example 2-2 W.D*4 | Comparative Example 2-3 W.W | Comparative Example 2-4 W.W |
|---|---|---|---|---|---|---|---|---|---|
| Magnetic Layer | d | μm | 0.28 | 0.15 | 0.02 | 0.15 | 0.15 | 0.28 | 0.01 |
|  | σ | μm | 0.06 | 0.05 | 0.01 | 0.007 | 0.007 | 0.012 | 0.01 |
|  | σ/d | — | 0.21 | 0.267 | 0.5 | 0.047 | 0.047 | 0.043 | 1.0 |
|  | a*2 | μm | 0.5 | 0.5 | 0.5 | 0.5 | 0.5 | 0.02 | 0.02 |
|  | a/d | — | 1.78 | 3.33 | 25.0 | 3.33 | 3.33 | 0.07 | 2.00 |
| Non-Magnetic Layer | Thickness | μm | 2.1 | 2.1 | 2.1 | 0 | 2.1 | 2.1 | 2.1 |
| Running Durability | Output*3 | dB | −4 | −4.5 | −3 | — | — | — | — |
|  | Clogging | — | none | none | none | clogging at 520 passes | clogging at 10500 passes | clogging at 9850 passes | clogging at 250 passes |

*1: Simultaneous multi-layer (wet-on-wet)
*2: The longest diameter of α-alumina
*3: A drop in output after 20,000 running times
*4: Sequential multi-layer (wet-on-dry)

As is apparent from Table 3, the floppy disks of the present invention having a mean thickness d of the magnetic layer satisfying the range of more than 0.01 μm to less than 0.3 μm and a σ/d satisfying the relationship of $0.05 \leq \sigma/d \leq 0.5$ are superior to comparative tapes not satisfying the above-mentioned conditions in the running durability.

Thus, the magnetic recording medium of the present invention comprises at least two layers comprising at least one lower non-magnetic layer containing a non-magnetic particle and a binder on a non-magnetic support, and at least one upper magnetic layer containing a ferromagnetic particle and a binder on the lower non-magnetic layer, wherein the mean total thickness d of the upper magnetic layer is more than 0.01 μm to less than 0.3 μm, and the standard deviation σ of the total thickness of the upper magnetic layer and the mean total thickness d of the upper magnetic layer satisfy the relationship of $0.05 \leq \sigma/d \leq 0.5$. Preferably, the longest diameter a of the non-magnetic particle contained in the upper magnetic layer and the mean total thickness d of the upper magnetic layer satisfy the relationship of $0.1 \leq a/d \leq 5$. As a result, the unevenness of the interface between the lower non-magnetic layer and the upper magnetic layer and the surface roughness of the upper magnetic layer can be suitably controlled, so that the running durability can be ensured, and the electromagnetic conversion characteristics such as the output, the half-value width $W_{50}$, the symmetry γ and the overwrite aptitude can be improved.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising a non-magnetic support and at least two layers, the at least two layers comprising at least one lower non-magnetic layer comprising non-magnetic particles and a binder, one of the at least one non-magnetic layers being located on the non-magnetic support, and at least one upper magnetic layer comprising ferromagnetic particles and a binder, one of the at least one upper magnetic layers being located on the lower non-magnetic layer located on the non-magnetic support, wherein the upper magnetic layer located on the lower non-magnetic layer located on the non-magnetic support has a mean total thickness d more than 0.01 μm to less than 0.3 μm, and a standard deviation σ of the total thickness of the upper magnetic layer located on the lower non-magnetic layer located on the non-magnetic support and the mean total thickness d satisfy the following relationship:

$$0.05 < \sigma/d < 0.5.$$

2. The magnetic recording medium as in claim 1, wherein the magnetic recording medium is selected from the group consisting of an audio tape, a video tape, a computer tape and a floppy disk for digital signal recording.

3. The magnetic recording medium as in claim 1, further comprising non-magnetic particles located in the upper magnetic layer, the upper layer non-magnetic particles having a mean particle size of 0.005 to 2 μm.

4. The magnetic recording medium as in claim 1, further comprising non-magnetic particles located in the upper magnetic layer, the upper layer non-magnetic particles having an average longest diameter a satisfying the following relationship:

$$0.1 \leq a/d \leq 5.$$

5. The magnetic recording medium as in claim 1, wherein the magnetic recording medium has a coercive force in a plane of the upper magnetic layer parallel to a plane of the non-magnetic support of from 1,000 to 3,000 Oe, the coercive force being measured in a direction along a plane wherein the coercive force is highest, and the upper magnetic layer has a saturation magnetization in the plane of the upper magnetic layer parallel to a plane of the non-magnetic support of from 0.002 to 0.15 emu.

6. The magnetic recording medium as in claim 1, wherein the upper magnetic layer located on the lower non-magnetic layer located on the non-magnetic support has a coercive force in a direction perpendicular to a plane of the non-magnetic support of from 900 to 5,000 Oe, and a saturation magnetization per $cm^2$ in the perpendicular direction of from 0.001 to 0.014 emu.

7. The magnetic recording medium as in claim 1, wherein the lower non-magnetic layer is forced from a coating solution coated on the non-magnetic support and then, while the coating solution is still in a wet state, a coating solution for forming the upper magnetic layer is coated on the lower non-magnetic layer.

8. The magnetic recording medium as in claim 1, wherein the magnetic recording medium has a half-value width $W_{50}$ of an isolated pulse waveform of 0.6 μm or less and a symmetry γ thereof at a recording current of at least 20 mA is up to 10%, as measured using an external contact type drum tester equipped with a laminated Sendust head having a gap length of 0.2 μm and a track width of 20 μm at a relative tape speed at the magnetic head of 3.8 m/sec.

9. The magnetic recording medium as in claim 1, wherein the mean total thickness d of the upper magnetic layer is from 0.02 to 0.25 μm and σ/d is from 0.1/l to 0.4/l.

10. The magnetic recording medium as in claim 1, wherein a difference ΔT between a maximum value and a minimum value of the total thickness of the upper magnetic layer located on the lower non-magnetic layer located on the non-magnetic support satisfies the following relationship:

$$0.001 < \Delta T/d < 0.55.$$

11. The magnetic recording medium as in claim 1, further comprising non-magnetic abrasive particles located in the upper magnetic layer located on the lower non-magnetic layer located on the non-magnetic support.

12. The magnetic recording medium as in claim 1, further comprising non-magnetic particles located in the upper magnetic layer located on the lower non-magnetic layer located on the non-magnetic support in an amount of 0.01 to 30 parts by weight per 100 parts by weight of the ferromagnetic particles.

13. The magnetic recording medium as in claim 1, further comprising non-magnetic particles present in the upper magnetic layer located on the lower non-magnetic layer located on the non-magnetic support in a proportion from 20 to 0.1 by weight and from 10 to 0.1 by volume, based on the binder in the upper magnetic layer located on the lower non-magnetic layer located on the non-magnetic support.

14. The magnetic recording medium as in claim 1, wherein the lower non-magnetic layer or the upper magnetic layer has a multilayer structure.

15. The magnetic recording medium as in claim 1, further comprising carbon black located in the upper magnetic layer located on the lower non-magnetic layer located on the non-magnetic support the carbon black being present in an amount of 0.1 to 30% by weight based on the amount of the ferromagnetic particle in the upper magnetic layer located on the lower non-magnetic layer located on the non-magnetic support.

16. The magnetic recording medium as in claim 1, wherein the mean total thickness d of the upper magnetic layer located on the lower non-magnetic layer located on the non-magnetic support is from 0.02 to 0.23 μm.

17. The magnetic recording medium as in claim 1, wherein σ/d is from 0.1/1 to 0.4/1.

18. The magnetic recording medium as in claim 5, wherein the ferromagnetic particles are acicular ferromagnetic particles having an acicular ratio of 3/1 to 20/1 and a long axis length of 0.3 μm or less.

19. The magnetic recording medium as in claim 6, wherein the ferromagnetic particles are hexagonal tabular shaped ferromagnetic particles having an axis of easy magnetization perpendicular to a plate face.

20. The magnetic recording medium as in claim 16, wherein the mean total thickness d of the upper magnetic layer located on the lower non-magnetic layer located on the non-magnetic support is from 0.03 to 0.23 μm.

* * * * *